(12) United States Patent
Ryu et al.

(10) Patent No.: US 11,962,077 B2
(45) Date of Patent: Apr. 16, 2024

(54) ELECTRONIC DEVICE HAVING ANTENNA

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 229 days.

(21) Appl. No.: 17/594,663

(22) PCT Filed: Sep. 9, 2019

(86) PCT No.: PCT/KR2019/011629
§ 371 (c)(1),
(2) Date: Oct. 25, 2021

(87) PCT Pub. No.: WO2021/049674
PCT Pub. Date: Mar. 18, 2021

(65) Prior Publication Data
US 2022/0200139 A1    Jun. 23, 2022

(51) Int. Cl.
*H04Q 1/36* (2006.01)
*H01Q 1/24* (2006.01)
(Continued)

(52) U.S. Cl.
CPC ............. *H01Q 1/36* (2013.01); *H01Q 1/24* (2013.01); *H01Q 1/48* (2013.01); *H01Q 9/0407* (2013.01); *H04B 7/0413* (2013.01)

(58) Field of Classification Search
CPC .......... H04B 7/0413; H01Q 1/36; H01Q 1/24; H01Q 1/48; H01Q 9/0407
(Continued)

(56) References Cited

U.S. PATENT DOCUMENTS 10,312,602 B2 *   6/2019   Sanford ............... H01Q 9/0407
2013/0278467 A1   10/2013   Dassano et al.
(Continued)

FOREIGN PATENT DOCUMENTS

KR    1020090038465    4/2009
KR    1020180130700    12/2018

OTHER PUBLICATIONS

PCT International Application No. PCT/KR2019/011629, International Search Report dated Jun. 9, 2020, 4 pages.

*Primary Examiner* — Kevin M Burd
(74) *Attorney, Agent, or Firm* — LEE, HONG, DEGERMAN, KANG & WAIMEY

(57) ABSTRACT

An electronic device having an antenna, according to the present disclosure, includes: a first cone radiator which is provided between a first substrate and a second substrate, the upper part of which is connected to the first substrate and the lower part of which is connected to the second substrate, and which has an opening at the top thereof; a metal patch which is formed on the first substrate so as to be separated from the top opening; a second cone radiator which is provided between the first substrate and the second substrate, the upper part of which is connected to the first substrate and the lower part of which is connected to the second substrate, and which has an opening at the top thereof; and a shorting pin which is formed to electrically connect the metal patch and a ground layer of the second substrate.

18 Claims, 19 Drawing Sheets

(51) Int. Cl.
*H01Q 1/36* (2006.01)
*H01Q 1/48* (2006.01)
*H01Q 9/04* (2006.01)
*H04B 7/0413* (2017.01)

(58) Field of Classification Search
USPC .......................................................... 375/267
See application file for complete search history.

(56) References Cited

U.S. PATENT DOCUMENTS

| | | | |
|---|---|---|---|
| 2015/0070231 A1* | 3/2015 | Park | H01Q 3/36 |
| | | | 343/777 |
| 2015/0200445 A1* | 7/2015 | Murphy | H01Q 1/243 |
| | | | 343/702 |
| 2015/0357720 A1* | 12/2015 | Chen | H01Q 21/28 |
| | | | 343/727 |
| 2018/0358697 A1 | 12/2018 | Zhou et al. | |
| 2020/0106158 A1* | 4/2020 | Gomez Angulo | G06F 1/1698 |
| 2020/0314912 A1* | 10/2020 | Wang | H04W 74/0833 |
| 2022/0255213 A1* | 8/2022 | Ryu | H01Q 5/20 |

* cited by examiner

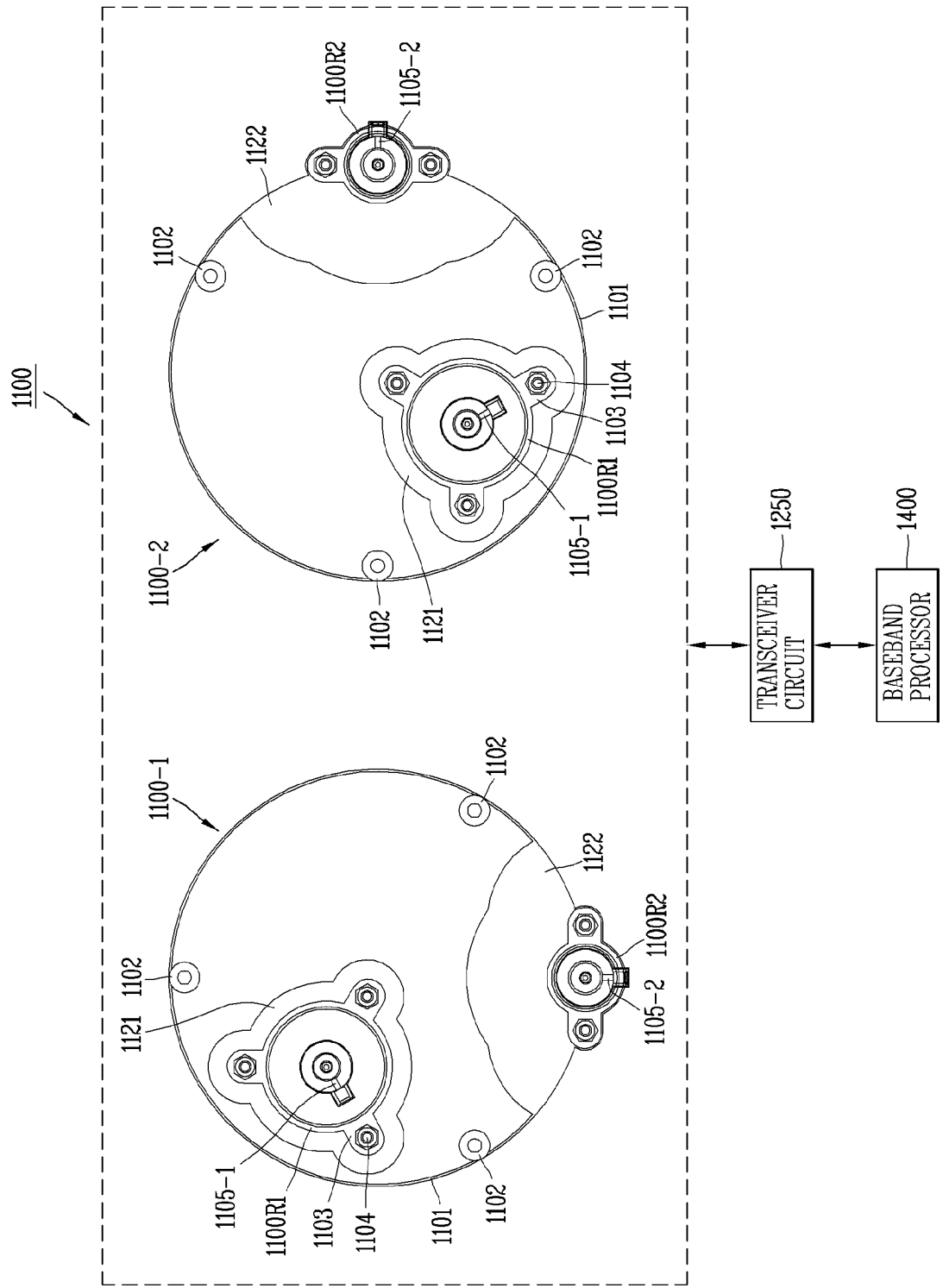

ELECTRONIC DEVICE HAVING ANTENNA

CROSS-REFERENCE TO RELATED APPLICATIONS

This application is the National Stage filing under 35 U.S.C. 371 of International Application No. PCT/KR2019/011629, filed on Sep. 9, 2019, the contents of which are all incorporated by reference herein in their entirety.

TECHNICAL FIELD

The present disclosure relates to an electronic device having a wideband antenna. More particularly, the present disclosure relates to an electronic device having a cone antenna operating from a low frequency band to a frequency band of 5 GHz.

BACKGROUND

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some terminals include additional electronic game play functions or perform a multimedia player function. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

Accordingly, a broadband antenna operating in both the LTE frequency band and the 5G Sub-6 frequency band needs to be disposed in the electronic device. However, the broadband antenna such as the cone antenna has problems in that an overall antenna size thereof increases and a weight thereof increases.

Furthermore, the broadband antenna such as the cone antenna may be implemented in a three-dimensional structure compared to a planar antenna in the related art. Accordingly, there is a problem in that there is no specific arrangement structure for arranging the cone antenna with such a three-dimensional structure in an electronic device or vehicle.

SUMMARY

An aspect of the present disclosure is to solve the above-mentioned problems and other problems. Furthermore, another aspect of the present disclosure is to provide an electronic device having a broadband antenna element operating from a low frequency band to a 5 GHz band.

Still another aspect of the present disclosure is to provide an electronic device or vehicle in which a plurality of antenna elements operating from a low frequency band to a 5 GHz band are arranged.

Yet still another aspect of the present disclosure is to provide an antenna structure having a shared structure in which part of a radiating element is shared to reduce a size of an antenna element operating from a low frequency band to a 5 GHz band.

In order to achieve the foregoing or other objectives, an electronic device having an antenna according to the present disclosure is provided. The electronic device may provide a multi-cone antenna module including a first cone radiator provided between the first substrate and the second substrate, an upper part of which is connected to the first substrate, a lower part of which is connected to the second substrate, and provided with an aperture at the upper part; a metal patch disposed on the first substrate, and spaced apart from the upper aperture; a second cone radiator provided between the first substrate and the second substrate, an upper part of which is connected to the first substrate, a lower part of which is connected to the second substrate, and provided with an aperture at the upper part; and a shorting pin disposed to electrically connect the metal patch and the ground layer of the second substrate, thereby allowing to operate in a wide frequency band. Here, the second substrate may be spaced apart from the first substrate by a predetermined gap and provided with a ground layer.

According to an embodiment, the metal patch may include a first dielectric region from which metal is removed in a region where the first upper aperture of the first cone radiator is disposed; and a second dielectric region from which metal is removed in a region where the second upper aperture of the second cone radiator is disposed. Here, a diameter of the second upper aperture may be smaller than that of the first upper aperture. Accordingly, one or more cone radiators operating from a low frequency band to a 5 GHz band may be optimally disposed with the metal patch in an electronic device or vehicle to optimize antenna performance.

According to an embodiment, the metal patch may be a circular patch, the first dielectric region of the circular patch may be disposed to surround the first upper aperture. In this case, the second dielectric region of the circular patch may be disposed at one side of the second upper aperture. Accordingly, one or more cone radiators operating from a low frequency band to a 5 GHz band may be optimally disposed with the metal patch in an electronic device or vehicle to optimize antenna performance.

According to an embodiment, the electronic device may further include a third cone radiator, an upper part of which is connected to the first substrate, and a lower part of which is connected to the second substrate, and provided at a third upper aperture at the upper part. In this regard, the metal patch may further include a third dielectric region from which metal is removed in region where the third upper aperture is disposed, and the first upper aperture to the third upper aperture may be disposed adjacent to the metal patch to share the metal patch. Accordingly, metal patches with various shapes may be disposed around an upper aperture of the cone antenna to provide a broadband antenna with an optimal structure according to the operating frequency and design conditions of the antenna.

According to an embodiment, the first upper aperture to the third upper aperture may be disposed inside a diameter of the metal patch so as to allow the first dielectric region to the third dielectric region of the metal patch to be disposed to surround the first upper aperture to the third upper aperture, respectively.

According to an embodiment, the first upper aperture may be disposed within a diameter of the metal patch so as to allow the first dielectric region of the metal patch to be disposed to surround the first upper aperture. On the contrary, a partial region of the second upper aperture and the third upper aperture may be disposed outside a diameter of the metal patch so as to allow the second dielectric region and the third dielectric region to be disposed at one side of the second upper aperture and the third upper aperture.

According to an embodiment, the shorting pin may be configured with a plurality of shorting pins spaced apart at a predetermined angle to vertically connect the metal patch and the ground layer of the second substrate. Accordingly, the number of shorting pins may be configured in various ways to provide an optimal cone antenna module in consideration of a limited region of an electronic device.

According to an embodiment, a first shorting pin among the plurality of shorting pins may be connected to one side of the first cone radiator on the metal patch, and a second shorting pin among the plurality of shorting pins may be connected to the other side of the first cone radiator on the metal patch.

According to an embodiment, the first shorting pin and the second shorting pin among the plurality of shorting pins may be connected to one side and the other side of the first cone radiator on the metal patch, and the first shorting pin and the third shorting pin among the plurality of shorting pins may be connected to the other side of the second cone radiator on the metal patch.

According to an embodiment, the electronic device may further include a first power feeder disposed on the second substrate to transmit a signal to the first cone radiator through a lower aperture; and a second power feeder disposed on the second substrate to transmit a signal to the second cone radiator through a lower aperture. On the other hand, end portions of the first power feeder and the second power feeder may be defined in ring shapes so as to correspond to the shapes of the lower apertures of the first cone radiator and the second cone radiator, respectively.

According to an embodiment, the electronic device may further include a transceiver circuit connected to the first and second cone radiators through the first and second power feeders, respectively, to control a first signal in a first frequency band to be radiated through the first cone antenna, and to control a second signal to be radiated in a second frequency band higher than the first frequency band through the second cone antenna.

According to an embodiment, the electronic device may further include at least one non-metal supporter configured to vertically connect the first substrate and the second substrate so as to support the first substrate and the second substrate.

According to an embodiment, the first cone radiator may further include an outer rim configured to constitute the upper aperture of the first cone antenna so as to connect the first cone radiator to the first substrate; and a fastener configured to connect the outer rim and the first substrate. Here, the first cone radiator may be mechanically fastened to the first substrate through three fasteners on a region facing the outer rim.

According to an embodiment, the electronic device may further include a fastener configured to be connected to the second substrate through an inside of an end portion of the first power feeder and an end portion of the second power feeder. On the other hand, the first and second cone radiators may be fixed to the second substrate on which the first power feeder and the second power feeder are disposed through the fastener.

A vehicle having an antenna according to another aspect of the present disclosure is presented. An antenna system provided in the vehicle may include a first cone radiator disposed to connect a first substrate and a second substrate spaced apart from the first substrate by a predetermined gap, and provided with a first upper aperture and a first lower aperture; a metal patch disposed on the first substrate, and spaced apart from the first upper aperture; and a second cone radiator disposed to connect the first substrate and the second substrate, and provided with a second upper aperture and a second lower aperture. Furthermore, the antenna system may further include a first power feeder disposed on the second substrate to transmit a first signal through the first lower aperture; and a second power feeder disposed on the second substrate to transmit a second signal through the second lower aperture.

According to an embodiment, the vehicle may further include a shorting pin disposed to electrically connect the metal patch and the ground layer of the second substrate, wherein the shorting pin is configured with a plurality of shorting pins spaced apart at a predetermined angle to vertically connect the metal patch and the ground layer of the second substrate of the second substrate. Accordingly, the number of shorting pins may be configured in various ways to provide an optimal cone antenna module in consideration of the mobility of the vehicle.

According to an embodiment, a cone antenna including the first and second cone radiators may be implemented with a plurality of cone antennas disposed in the vehicle. In this case, the vehicle may further include a transceiver circuit connected to the first and second cone radiators through the first and second power feeders, respectively, to control a first signal in a first frequency band to be radiated through the first cone antenna, and to control a second signal in a second frequency band higher than the first frequency band to be radiated through the second cone antenna.

According to an embodiment, the vehicle may further include a processor that controls an operation of the transceiver circuit. Here, the processor may control the transceiver circuit to perform multi-input multi-output (MIMO) through a plurality of first cone radiators when a resource of the first frequency band is allocated, and may control the transceiver circuit to perform multi-input multi-output (MIMO) through a plurality of second cone radiators when a resource of the second frequency band is allocated.

According to an embodiment, when both the resource of the first frequency band and the resource of the second frequency band are allocated, the processor may control the transceiver circuit to perform carrier aggregation (CA) on a first signal and a second signal received through the first cone radiator and the second cone radiator to acquire first and second information included in the first and second signals, respectively. Accordingly, the processor may simultaneously acquire both the first and second information included in the first and second signals, respectively.

According to an embodiment, the metal patch may include a first dielectric region from which metal is removed in a region where the first upper aperture of the first cone radiator is disposed; and a second dielectric region from which metal is removed in a region where the second upper aperture of the second cone radiator is disposed. Here, a diameter of the second upper aperture may be smaller than that of the first upper aperture.

According to the present disclosure, there is an advantage capable of providing a multi-cone antenna module operating in a wide frequency band.

Furthermore, according to the present disclosure, one or more cone radiators operating from a low frequency band to a 5 GHz band may be optimally disposed with the metal patch in an electronic device or vehicle, thereby having an advantage capable of optimizing antenna performance.

Furthermore, according to the present disclosure, the number of shorting pins may be configured in various ways, thereby having an advantage capable of providing an optimal cone antenna module in consideration of the mobility of the vehicle.

Furthermore, according to the present disclosure, the number of shorting pins may be configured in various ways, thereby having an advantage capable of providing an optimal cone antenna module in consideration of a limited region of an electronic device.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Furthermore, according to the present disclosure, one or more cone radiators operating from a low frequency band to a 5 GHz band may be optimally disposed inside one metal patch in an electronic device or vehicle, thereby having an advantage capable of reducing a size of the antenna as well as optimizing antenna performance.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

BRIEF DESCRIPTION OF THE DRAWINGS

Referring to FIGS. 1A to 1C.

FIG. 13A shows a shape of an electronic device or vehicle having a plurality of cone antennas according to an embodiment of the present disclosure. Furthermore.

DETAILED DESCRIPTION

Figure 1A:
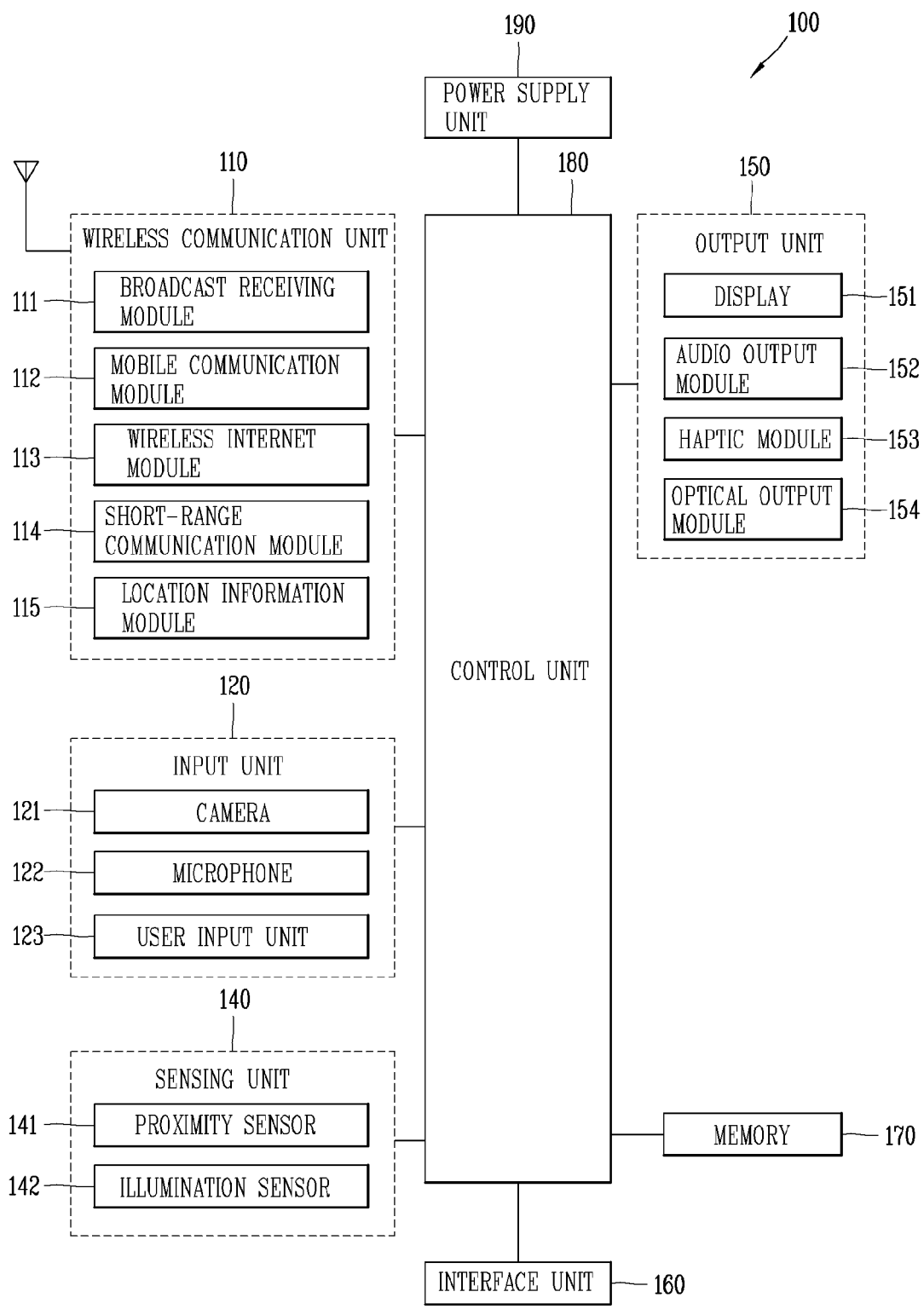
FIG. 1A is a block diagram of an electronic device in accordance with one exemplary implementation of the present disclosure.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
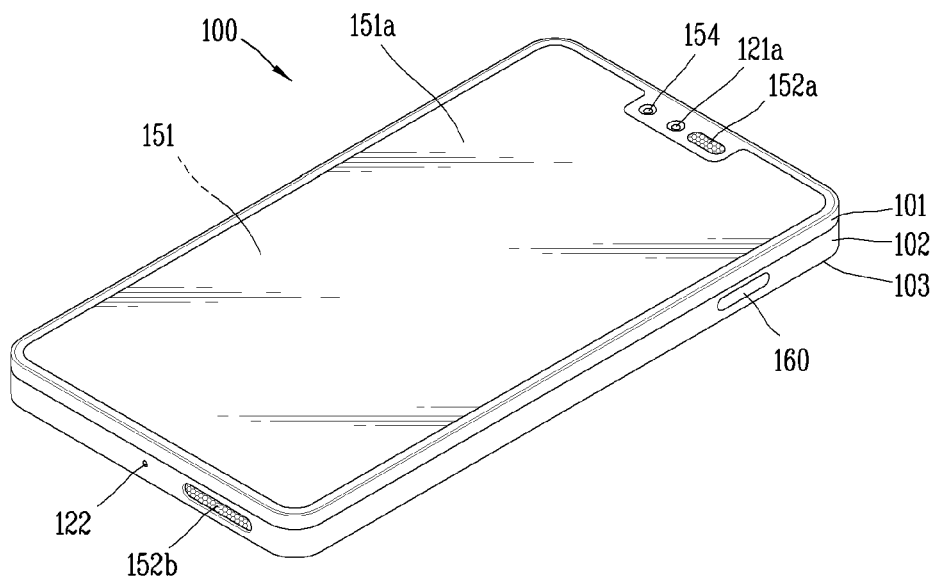
FIGS. 1B and 1C are conceptual views illustrating one example of an electronic device, viewed from different directions.
Figure 1C:
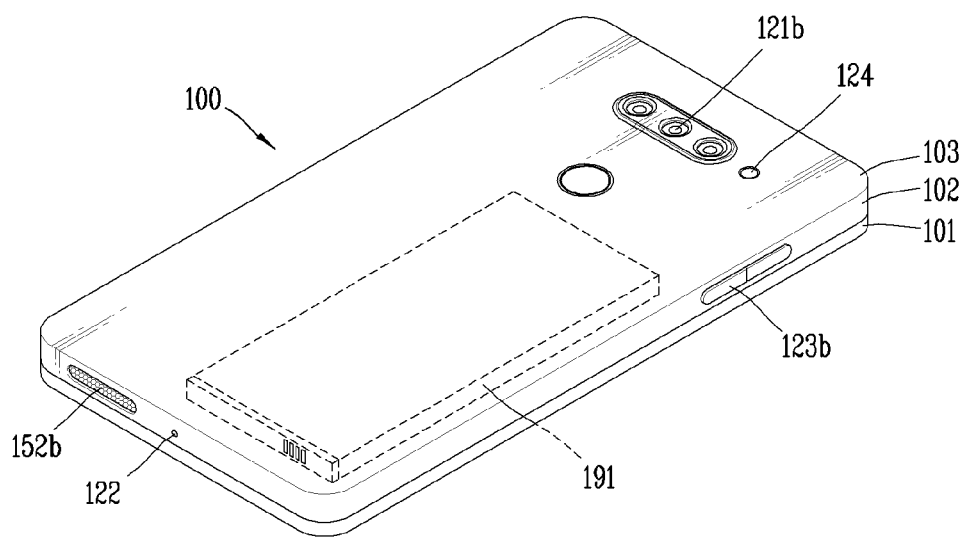

Referring to FIGS. 1A to 1C, FIG. 1A is a block diagram of an electronic device in accordance with one exemplary implementation of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for instance, a 4G communication network and a 5G communication network.

The wireless communication unit 110 may include at least one of a 4G wireless communication module 111, a 5G wireless communication module 112, a short-range communication module 113, a location information module 114 and the like.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station.

In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-stand-alone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. On the other hand, for the 5G frequency band, a sub-6 band, which is a band below 6 GHz, may be used.

On the contrary, a millimeter wave (mmWave) band may be used as a 5G frequency band to perform broadband high-speed communication. When the mmWave band is used, the electronic device 100 may perform beam forming for communication coverage expansion with a base station.

Meanwhile, regardless of the 5G frequency band, in a 5G communication system, a larger number of multi-input multi-output (MIMO) may be supported to improve transmission speed. In this instance, UL MIMO may be performed by a plurality of 5G transmission signals transmitted to a 5G base station. In addition, DL MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system.

Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensor unit 140 may typically be implemented using one or more sensors configured to sense internal information of the electronic device, the surrounding environment of the electronic device, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The electronic device disclosed herein may be configured to utilize information obtained from one or more sensors, and combinations thereof.

The output unit 150 may be configured to output an audio signal, a video signal or a tactile signal. The output unit 150 may include a display module 151, an audio output module 152, a haptic module 153, an optical output unit 154 and the like. The display module 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user in a manner of processing signals, data, information and the like, which are input or output by the aforementioned components, or activating the application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display module 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The electronic device 100 may include a display module 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display module 151 may include a touch sensor which senses a touch onto the display module 151 so as to receive a control command in a touching manner. Accordingly, when a touch is applied to the display module 151, the touch sensor may sense the touch, and a controller 180 may generate a control command corresponding to the touch. The content which is input in the touching manner may be a text or numerical value, or a menu item which can be indicated or designated in various modes.

In this manner, the display module 151 may form a flexible touch screen along with the touch sensor, and in this case, the touch screen may function as the user input unit 123 (refer to FIG. 1A). Therefore, the touch screen may replace at least part of the functions of the first manipulation unit 123a.

The first audio output module 152a may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user has checked a generated event, the controller 180 may control the optical output module 154 to stop the light output.

The first camera 121a may process video frames such as still or moving images acquired by the image sensor in a video call mode or a capture mode. The processed video frames may be displayed on the display module 151, and stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display module 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device having the same according to the present disclosure, with reference to the accompanying drawings. It should be understood by those skilled in the art that the present disclosure can be embodied in other specific forms without departing from the concept and essential characteristics thereof.

Figure 2:
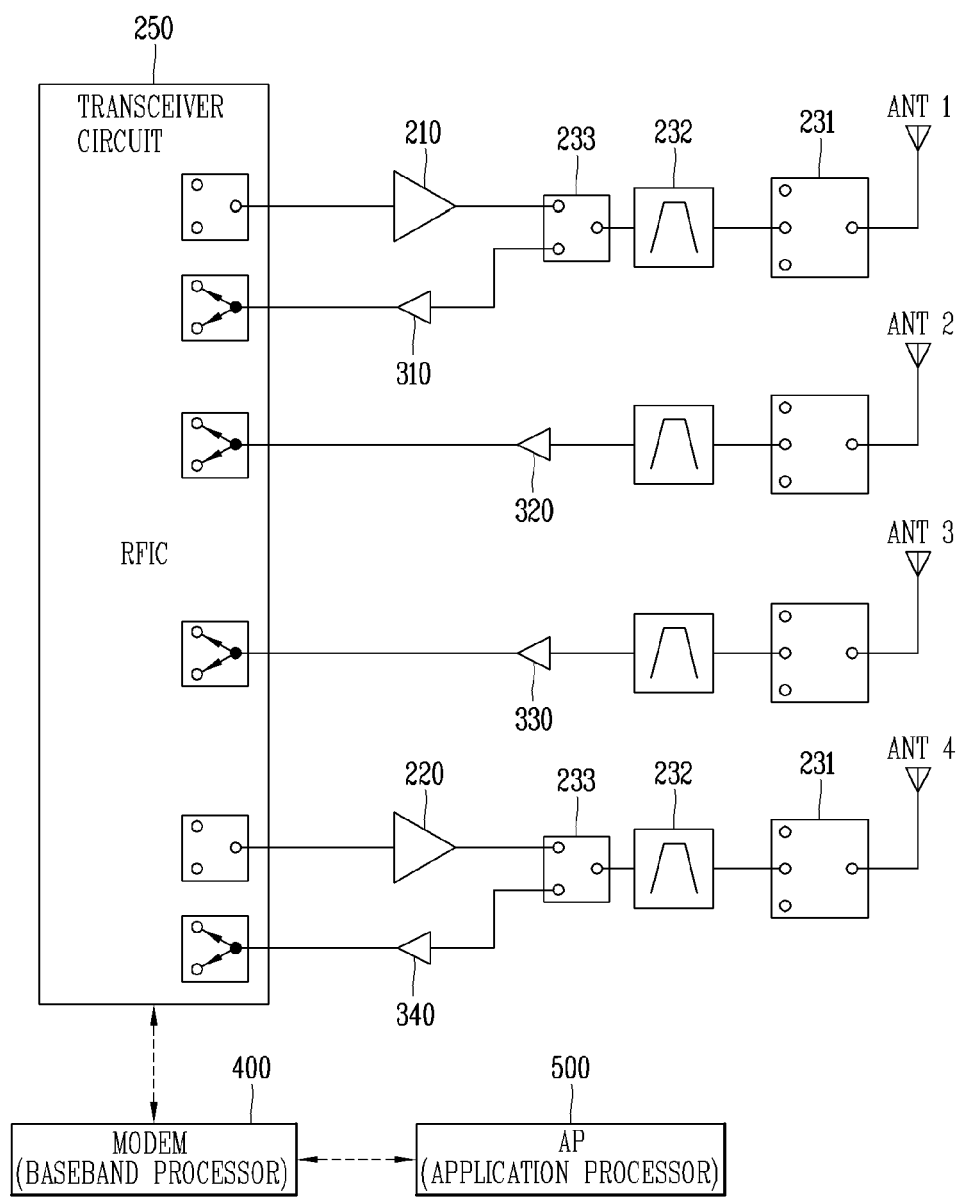
FIG. 2 is a block diagram illustrating a configuration of a wireless communication unit of an electronic device operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 450. Here, the modem 400 and the application processor (AP) 450 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 310 to 340 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but is not limited thereto, and may also be configured as a 4G/5G separation type according to an application. When the RFIC 250 is configured as a 4G/5G integrated type, it is advantageous in terms of synchronization between 4G/5G circuits, and also there is an advantage capable of simplifying control signaling by the modem 400.

On the other hand, when the RFIC 250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 450 is configured to control the operation of each component of the electronic device. Specifically, the application processor (AP) 450 may control the operation of each component of the electronic device through the modem 400.

For example, the modem 400 may be controlled through a power management IC (PMIC) for low power operation of the electronic device. Accordingly, the modem 400 may operate the power circuits of the transmitter and the receiver in a low power mode through the RFIC 250.

In this regard, when it is determined that the electronic device is in an idle mode, the application processor (AP) 450 may control the RFIC 250 through the modem 400 as follows. For example, when the electronic device is in an idle mode, the application processor 280 may control the RFIC 250 through the modem 400, such that at least one of the first and second power amplifiers 110 and 120 operates in the low power mode or is turned off.

According to another implementation, the application processor (AP) 450 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 450 may control the modem 400 to enable wireless communication at the lowest power. Accordingly, the application processor (AP) 450 may control the modem 400 and the RFIC 250 to perform short-range communication using only the short-range communication module 113, even at the expense of throughput.

According to another implementation, when the remaining battery level of the electronic device is above the threshold, the modem 400 may be controlled to select an optimal wireless interface. For example, the application processor (AP) 450 may control the modem 400 to receive data through both the 4G base station and the 5G base station according to the remaining battery level and the available radio resource information. In this case, the application processor (AP) 450 may receive the remaining battery information from the PMIC, and the available radio resource information from the modem 400. Accordingly, when the remaining battery level and the available radio resources are sufficient, the application processor (AP) 450 may control the modem 400 and the RFIC 250 to receive data through both the 4G base station and 5G base station.

Meanwhile, a multi-transceiving system of FIG. 2 may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 210 and the second power amplifier 220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented with 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 250, and an additional component does not need to be disposed externally, thereby improving component mountability. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a duplexer 231, a filter 232, and a switch 233.

The duplexer 231 is configured to separate signals in a transmission band and a reception band from each other. In this case, signals in a transmission band transmitted through the first and second power amplifiers 210, 220 are applied to the antennas (ANT1, ANT4) through a first output port of the duplexer 231. On the contrary, a signal in a reception band received through the antennas (ANT1, ANT4) are received by the low noise amplifiers 310, 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator.

Meanwhile, in another embodiment of the present disclosure, the switch 233 may also be applicable to a frequency division duplex (FDD) scheme. In this case, the switch 233 may be configured in the form of a double-pole double-throw (DPDT) to connect or block a transmission signal and a reception signal, respectively. On the other hand, the transmission signal and the reception signal may be separated by the duplexer 231, and thus the switch 233 is not necessarily required.

Meanwhile, the electronic device according to an implementation may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally divided into a single circuit.

The modem 400 may perform control and signal processing for the transmission and reception of signals through different communication systems through the RFIC 250. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210, 220 to transmit 4G or 5G signals in a specific time interval. In addition, the RFIC 250 may control reception circuits including first through fourth low-noise amplifiers 310 to 340 to receive 4G or 5G signals in a specific time interval.

On the other hand, a detailed operation and function of an electronic device having an array antenna operating in different bands according to the present disclosure provided with a multi-transceiving system as shown in FIG. 2 will be described below.

In a 5G communication system according to the present disclosure, a 5G frequency band may include a Sub-6 band and/or an LTE frequency band higher than the LTE frequency band. As such, a broadband antenna capable of supporting both the 4G communication system and the 5G communication system needs to be provided in the electronic device. In this regard, the present disclosure provides a broadband antenna (e.g., cone antenna) capable of operating from a low frequency band to about 5 GHz band.

Figure 3:
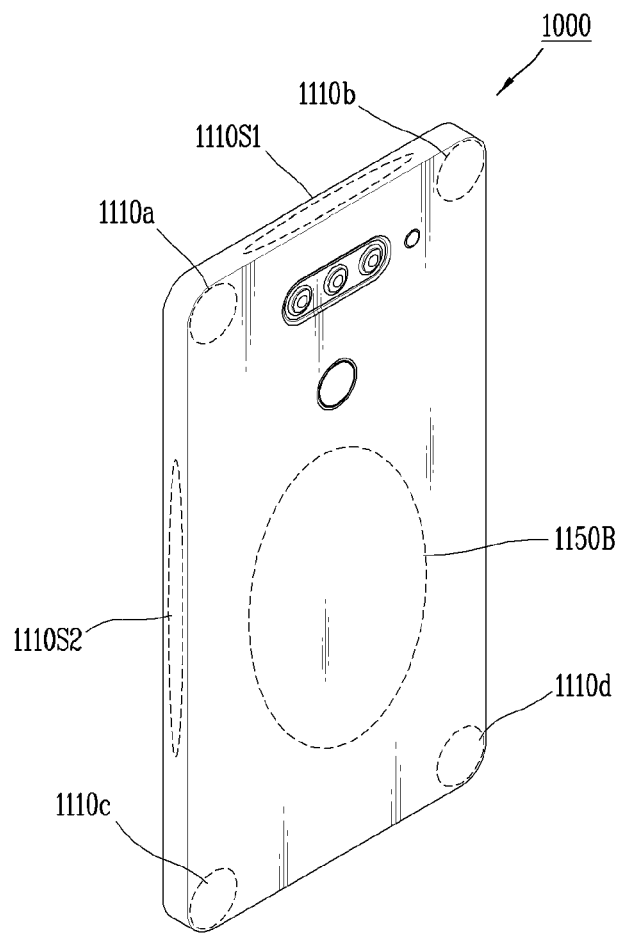
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110a to 1110d or 1150B may be arranged on a rear surface of the electronic device 100. Alternatively, a plurality of antennas 1110S1 and 1110S2 may be disposed on a side surface of the electronic device 100. Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. In addition, a cone antenna according to the present disclosure may be mounted on a vehicle other than an electronic device to provide a 4G communication service and a 5G communication service.

On the other hand, referring to FIG. 2, a plurality of antennas (e.g., cone antennas) ANT 1 to ANT 4 may be arranged on a side surface or a rear surface of the electronic device 100.

Meanwhile, referring to FIGS. 2 and 3, at least one signal may be transmitted or received through the plurality of antennas 1110a to 1110d corresponding to the plurality of antennas ANT 1 to ANT 4. In this regard, each of the plurality of antennas 1110a to 1110d may be configured with a single cone antenna. The electronic device may communicate with a base station through any one of the plurality of cone antennas 1110a to 1110d. Alternatively, the electronic device may perform multi-input multi-output (MIMO) communication with the base station through two or more antennas among the plurality of cone antennas 1110a to 1110d.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of cone antennas 1110S1 to 1110S4 on a side surface of the electronic device 100. On the other hand, the electronic device may communicate with the base station through any one of the plurality of cone antennas 1110S1 to 1110S4. Alternatively, the electronic device may perform multi-input multi-output (MIMO) communication with the base station through two or more antennas among the plurality of cone antennas 1110S1 to 1110S4.

On the other hand, in the present disclosure, at least one signal may be transmitted or received through the plurality of cone antennas 1110a to 1110d, 1150B, and 1110S1 to 1110S4 on a rear surface and/or a side surface of the electronic device 100. Meanwhile, the electronic device may communicate with the base station through any one of the plurality of antennas 1110a to 1110d, 1150B, and 1110S1 to 1110S4. Alternatively, the electronic device may perform multi-input multi-output (MIMO) communication with the base station through two or more antennas among the plurality of antennas 1110a to 1110d, 1150B, and 1110S1 to 1110S4.

Hereinafter, an electronic device having a cone antenna according to the present disclosure will be described.

Figure 4A:
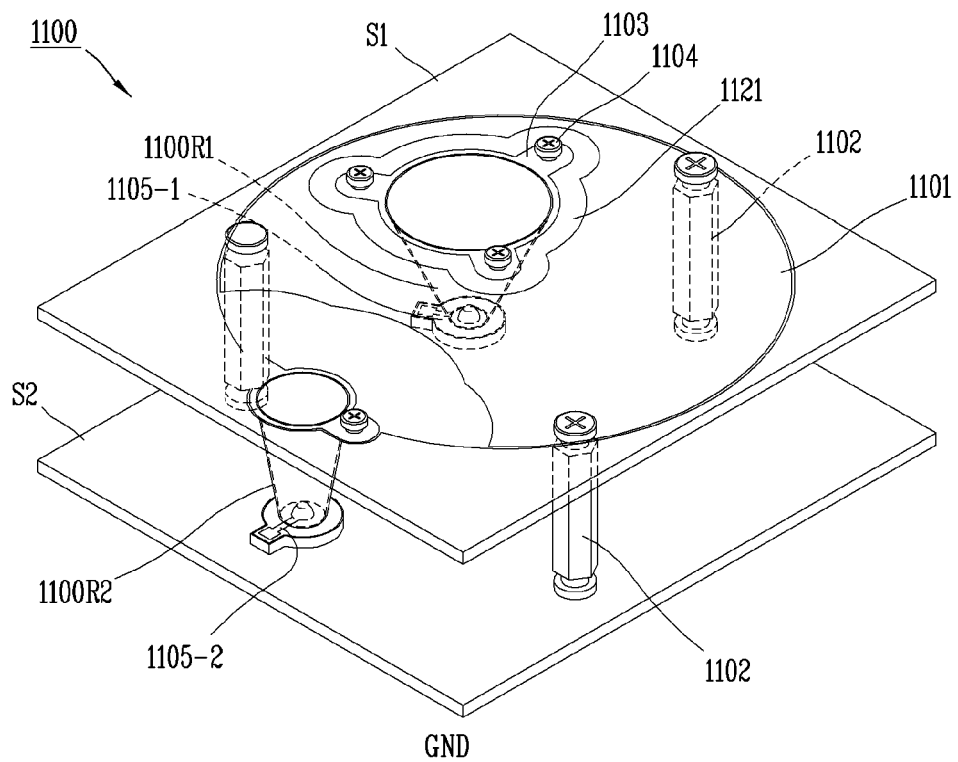
FIG. 4A is a perspective view showing a three-dimensional structure of a cone antenna according to the present disclosure. On the other hand.
Figure 4B:
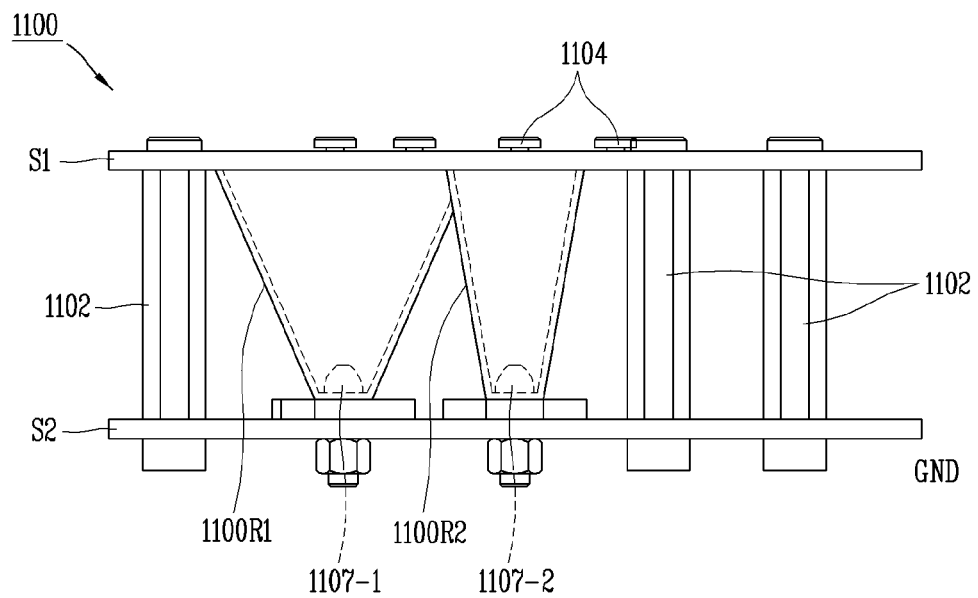
FIG. 4B is a side view showing a three-dimensional structure of the cone antenna according to the present disclosure.

In this regard, FIGS. 4A and 4B show a detailed structure of a broadband antenna (e.g., a cone antenna) capable of operating from a low frequency band to about 5 GHz band according to the present disclosure. Specifically, FIG. 4A shows a perspective view of a three-dimensional structure of a cone antenna according to the present disclosure. On the other hand, FIG. 4B shows a side view of a three-dimensional structure of the cone antenna according to the present disclosure.

Referring to FIGS. 4A and 4B, an electronic device having an antenna according to the present disclosure includes a cone antenna 1100. Here, the cone antenna 1100 may be configured to include a first radiator 1100R1 and a second cone radiator 1100R2. Accordingly, the present disclosure is characterized in that two or more cone radiators 1100R1, 1100R2 are provided in one metal patch 1101. Accordingly, an antenna structure having two or more cone radiators as shown in the present disclosure may be referred to as a "multi-cone antenna".

In this regard, the first radiator 1100R1 may operate to resonate in a first frequency band that is a low frequency band. On the contrary, the second cone radiator 1100R2 may operate to resonate in a second frequency band that is an intermediate frequency band or a high frequency band. However, the present disclosure is not limited thereto, and the first radiator 1100R1 may operate in a low frequency band and an intermediate frequency band, and the second cone radiator 1100R2 may operate in a high frequency band. Alternatively, the operating bands of the first radiator 1100R1 and the second cone radiator 1100R2 may overlap with each other in least part of the bands. Alternatively, the first radiator 1100R1 and the second cone radiator 1100R2 may operate as a single radiator by one feed line.

Specifically, the cone antenna 1100 includes a first substrate S1 corresponding to an upper substrate, a second substrate S2 corresponding to a lower substrate, and the first and second cone radiators 1100R1, 1100R2. Furthermore, the cone antenna 1100 may further include a metal patch 1101, the shorting pin 1102, and the power feeder 1105.

In addition, the cone antenna 1100 may further include an outer rim 1103 and fasteners 1104 for allowing the cone antenna 1100 to be fixed to the first substrate S1 through the outer rim 1103. Specifically, the outer rim 1103 constitutes an upper aperture of the first cone radiator 1100R1, and is configured to connect the first cone radiator 1100R1 to the first substrate S1. Meanwhile, the fasteners 1104 are configured to connect the outer rims 1103 and the first substrate S1. In this regard, the first cone radiator 1100R1 may be mechanically coupled to the first substrate S1 through three fasteners on a region facing the outer rim 1103. On the contrary, the number of the outer rims and the number of the fasteners for the second cone radiator 1100R2 may each be configured to be two.

Furthermore, the cone antenna 1100 may further include a fastener 1107 that fastens non-metal supporters 1106 to the power feeder 1105. Specifically, the fastener 1107 is configured to be connected to the second substrate S2 through an end portion of a first power feeder 1105-1 and an inside of an end portion of a second power feeder 1105-2. Accordingly, the second substrate S2 on which the first power feeder 1105-1 and the second power feeder 1105-2 are disposed and the first and second cone radiators 1100R1, 1100R2 are fixed through the fastener 1107. Here, the fasteners 1104 and 1107 may be implemented as fasteners such as screws having a predetermined diameter.

In this regard, the second substrate S2 may be spaced apart from the first substrate S1 by a predetermined gap, and may be provided with a ground layer GND. Meanwhile, the first cone radiator 1100R1 may be disposed to be provided between the first substrate S1 and the second substrate S2. Specifically, the first cone radiator 1100R1 may be vertically connected between the first substrate S1 and the second substrate S2 to connect the first substrate S1 and the second substrate S2. In addition, an upper part of the first cone radiator 1100R1 is connected to the first substrate S1, and a lower part thereof is connected to the second substrate S2, and the first cone radiator 1100R1 may include an upper aperture on the upper part.

Furthermore, the second cone radiator 1100R2 may also be disposed to be provided between the first substrate S1 and the second substrate S2. Specifically, the second cone radiator 1100R2 may be spaced apart from the first cone radiator 1100R1 by a predetermined distance to vertically connect between the first substrate S1 and the second substrate S2 so as to connect the first substrate S1 and the second substrate S2. In this regard, the first and second cone radiators 1100R1, 1100R2 may be spaced apart from each other in both axial directions on the same plane to minimize interference therebetween. In addition, an upper part of the second cone radiator 1100R2 is connected to the first substrate S1, and a lower part thereof is connected to the second substrate S2, and the second cone radiator 1100R2 may include an upper aperture on the upper part.

Meanwhile, the metal patch 1101 may be disposed on the first substrate S1 to be spaced apart from the upper aperture. In this regard, the metal patch 1101 may be disposed to be spaced apart from the first and second upper apertures of the first and second cone radiators 1100R1, 1100R2 with different gaps.

Meanwhile, an inner side shape of the metal patch 1101 may be disposed in a circular shape to correspond to a shape of an outer line of the upper aperture. Through this, a signal radiated from the cone radiator 1100R may be coupled through an inner side of the metal patch 1101.

On the other hand, the metal patch 1101 may be disposed at only one side to surround a partial region of an upper opening of the second cone radiator 1100R2. Accordingly, an overall size of the cone antenna 1100 including the metal patch 1101 may be minimized.

Meanwhile, the shorting pin 1102 is disposed to electrically connect the metal patch 1101 and the ground layer GND of the second substrate S2. On the other hand, the shorting pins 1102 may be implemented in a structure in which a fastener such as a screw having a predetermined diameter is inserted into a structure such as a dielectric.

In this regard, in order to arrange a plurality of cone antennas in an electronic device, the cone antennas need to be implemented with a small size. For this purpose, the cone antenna structure according to the present disclosure may be referred to as a "cone with a shorting pin" or a "cone with a shorting supporter".

In this regard, the number of shorting pins or shorting supporters may be one or two. Specifically, the number of shorting pins or shorting supports may not be limited thereto and may be changed according to applications. However, in the "cone with a shorting pin" or the "cone with a shorting supporter" according to the present disclosure, one or two shorting pins or shorting supporters may be implemented to reduce a size of the antenna.

Specifically, the shorting pin 1102 may be provided with a single shorting pin between the metal patch 1101 and the second substrate S2. By such a single shorting pin 1102, a null of a radiation pattern of the cone antenna may be prevented from being generated. The operation principle and technical characteristics thereof will be described in detail with reference to FIGS. 7A and 7B.

In this regard, in a typical cone antenna, a null of the radiation pattern may be generated from boresight in an elevation angle direction, thereby deteriorating reception performance. In order to solve this problem, in the present disclosure, the null of the radiation pattern may be removed from boresight in an elevation angle direction through a structure in which the cone antenna 1110 is connected to a single shorting pin 1102. Accordingly, the present disclosure has an advantage in that reception performance can be improved in almost all directions.

In this regard, the cone antenna with a single shorting pin forms a current path of the power feeder 1105—the cone radiator 1100R1 or 1100R2—the metal patch 1101—the shorting pin 1102—the ground layer GND. In this way, through an asymmetric current path of the power feeder 1105—the cone radiator 1100R1 or 1100R2—the metal patch 1101—the shorting pin 1102—the ground layer GND, a null of the radiation pattern may be prevented from being generated from boresight in the elevation angle direction.

Furthermore, a cone antenna with a multi-cone structure according to the present disclosure may be configured with a plurality of shorting pins, thereby implementing symmetry of electrical properties in various directions along with structural stability. In this regard, when configured with a plurality of shorting pins at predetermined angular intervals, the current distribution of the cone antenna with a multi-cone structure is symmetrically formed. Accordingly, there is an advantage in that mobility, in particular, symmetry of electrical characteristics in various directions can be maintained even when changing directions in an electronic device or vehicle provided with a cone antenna with a multi-cone structure. In this regard, when the plurality of shorting pins are symmetrically disposed, a null of the radiation pattern may be generated from boresight in the elevation angle direction. However, in the case of a vehicle, it is not important to transmit or receive a signal through boresight in the elevation angle direction. It will be described in detail below.

Meanwhile, the power feeder 1105 is disposed on the second substrate S2 and configured to transmit a signal through a lower aperture. To this end, an end portion of the power feeder 1105 may be defined in a ring shape to correspond to a shape of the lower aperture.

On the other hand, a cone antenna according to the present disclosure may further include at least one non-metal supporter 1106 to mechanically fix the cone radiator 1100R1, 1100R2 to the first substrate S1 and the second substrate S2. To this end, the non-metal supporter 1106 is configured to vertically connect the first substrate S1 and the second substrate S2 to support the first substrate S1 and the second substrate S2. On the other hand, since the non-metal supporter 1106 is not a metal and is not electrically connected to the metal patch 1101, the electrical characteristics of the cone antenna 1100 are not affected. Accordingly, the non-metal supporter 1106 may be disposed on an upper left portion, an upper right portion, a lower left portion, and a lower right portion of the first and second substrates S1 and S2 to vertically connect and support the first and second substrates S1 and S2. However, the present disclosure is not limited thereto, and may be modified into various structures capable of supporting the first substrate S1 and the second substrate S2.

Meanwhile, the outer rim 1103 may be integrally formed with the cone radiator 1100R, and may be connected to the first substrate S1 through the fasteners 1104. Here, the outer rim 1103 may be implemented as two outer rims at opposing points of the cone radiator 1100R.

On the other hand, the fastener 1107 may be configured to be connected to the second substrate S2 through an inside of an end portion (i.e., a ring shape) of the power feeder 1105. Accordingly, the second substrate S2 on which the power feeder 1105 is disposed and the cone radiator 1100R may be fixed through the fastener 1107. Accordingly, the fastener 1107 performs a role of fixing the cone radiator 1100R to the second substrate S2 as well as a role of a power feeder that transmits a signal to the cone radiator 1100R.

Figure 5A:
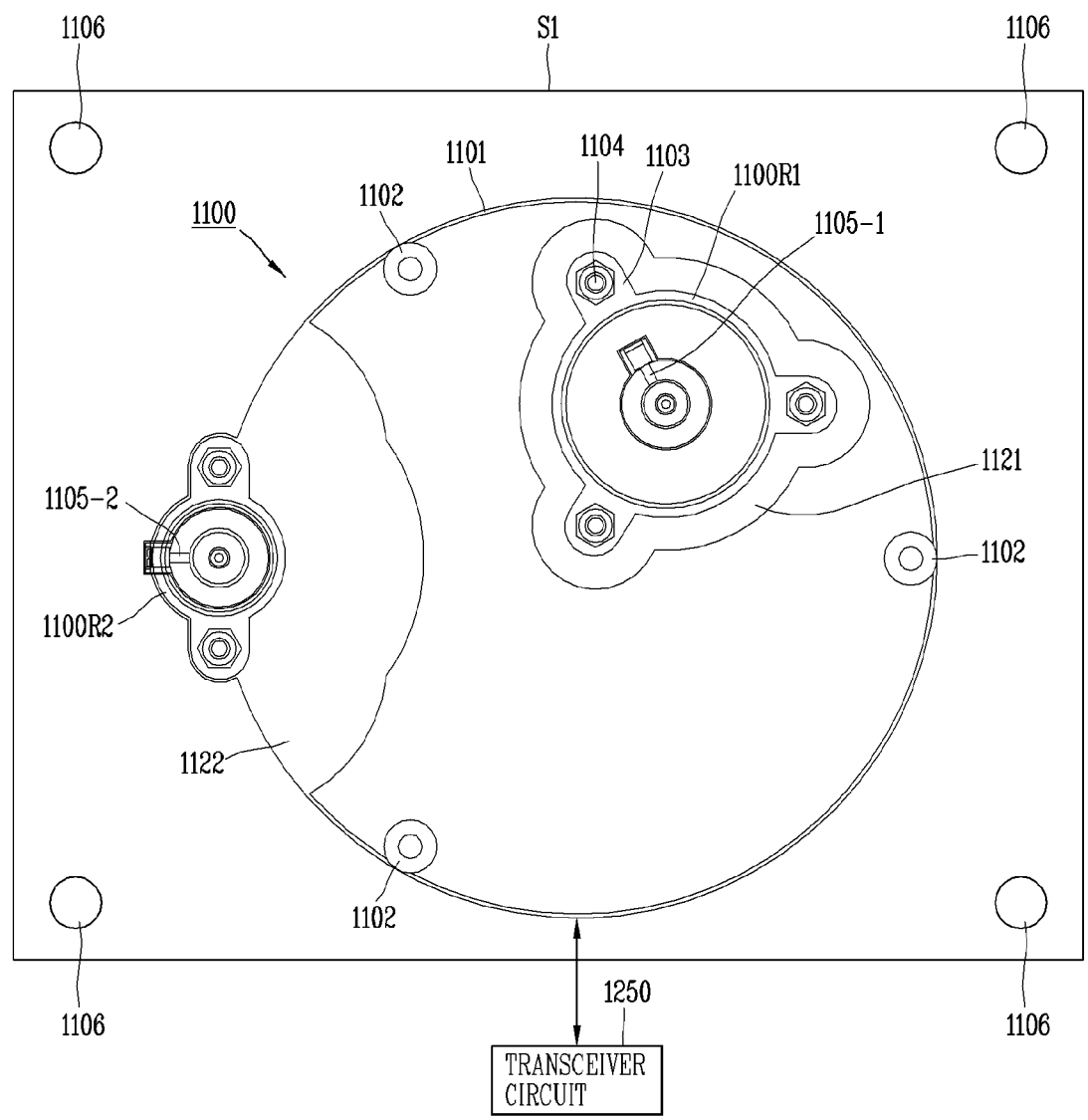
FIG. 5A shows a front view of a cone antenna with a multi-cone structure according to the present disclosure.
Figure 5B:
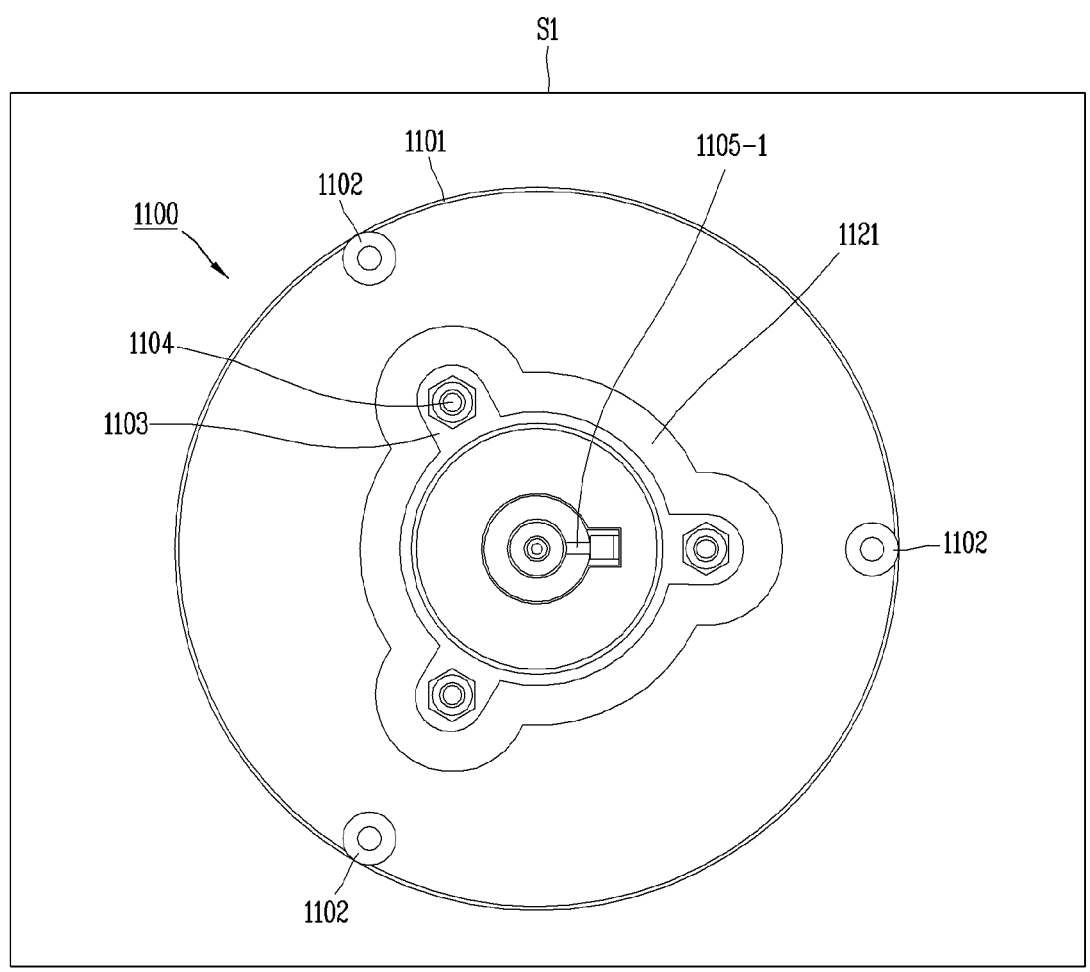
FIG. 5B shows a front view of a cone antenna having a single-cone structure with respect to the present disclosure.

On the other hand, FIG. 5A shows a front view of a cone antenna with a multi-cone structure according to the present disclosure. On the other hand, FIG. 5B shows a front view of a cone antenna having a single-cone structure in relation to the present disclosure.

The cone antenna 1100 with a multi-cone structure in FIG. 5A may be referred to as "two cones with a patch on three shorting pins". In this regard, three shorting pins may be disposed along a border of the metal patch 1101. On the other hand, the present disclosure is not limited to such a structure, and one of three supporters at a border of the metal patch 1101 may be a shorting pin and the other two may be configured as non-metal supporters. Accordingly, the cone antenna 1100 with a multi-cone structure in FIG. 5A may be referred to as "two cones with a patch on a single shorting pin". Alternatively, two or more of the plurality of supporters at a border of the metal patch 1101 may be shorting pins, and the remaining supporters may be configured as non-metal supporters.

On the other hand, according to an example, the cone antenna 1100 with a multi-cone structure having three shorting pins in FIG. 5A may be implemented as H×L× W=0.07×0.38×0.35$\lambda$ with respect to the height (H), the length (L) and the width (W). In this regard, when three shorting pins are provided, an overall size of the antenna is slightly increased, and a null may be formed from boresight in the elevation angle direction. However, when the current distribution is symmetrical by the three shorting pins to have high mobility in an electronic device or vehicle, there is an advantage in that the characteristics of the antenna are maintained substantially the same in various directions.

Accordingly, the cone antenna 1100 with a multi-cone structure having three shorting pins in FIG. 5A is suitable for a case in which mobility is high and a size of the antenna is not substantially restricted, such as a vehicle. On the contrary, a cone antenna with a multi-cone structure having a single shorting pin is suitable for a case in which mobility is low and a size of the antenna is restricted, such as a 5G communication relay apparatus, that is, 5G CPE. Furthermore, a cone antenna with a multi-cone structure having a single shorting pin may also be adopted in a case which there is mobility but a size of the antenna is restricted, such as a mobile terminal.

Accordingly, the cone antenna 1100 with a multi-cone structure in FIG. 5A may be configured with a plurality of shorting pins. In this regard, the shorting pin 1102 may be configured with a plurality of shorting pins spaced apart at a predetermined angle to vertically connect the metal patch 1101 and the ground layer GND of the second substrate S2. Specifically, a first shorting pin among the plurality of shorting pins 1102 may be connected to (i.e., disposed at) one side of the first cone radiator 1100R1 on the metal patch 1101. On the contrary, a second shorting pin among the plurality of shorting pins 1102 may be connected to (i.e., disposed at) the other side of the first cone radiator 1100R1 on the metal patch 1101. In other words, the first shorting pin and the second shorting pin may be disposed left and right sides of the first cone radiator 1100R1.

Meanwhile, the first shorting pin and the second shorting pin among the plurality of shorting pins 1102 may be connected to one side and the other side, that is, the left and right sides, of the first cone radiator 1100R1 on the metal patch 1101. On the contrary, the first shorting pin and the third shorting pin among the plurality of shorting pins 1102 may be connected only to the other side, that is, the right side, of the second cone radiator 1100R2 on the metal patch 1101.

In this regard, since the metal patch 1101 is disposed only at the other side, that is, the right side of the second cone radiator 1100R2, the first shorting pin and the third shorting pin are disposed only at the other side, that is, the right side, of the second cone radiator 1100R2. Accordingly, a structure having first to third shorting pins according to FIG. 5A has an advantage capable of improving mechanical stability as well as optimizing the structure and characteristics of the cone antenna.

On the contrary, referring to FIG. 5B, a cone antenna with a single-cone structure may be referred to as a "cone with a patch on three shorting pins". In this regard, three shorting pins may be disposed along a border of the metal patch. Meanwhile, the present disclosure is not limited to such a structure, and one of the three supporters at a border of the metal patch may be a shorting pin and the other two may be configured with non-metal supporters. Accordingly, the cone antenna 1100 with a multi-cone structure in FIG. 5B may be referred to as a "cone with a patch on single shorting pin". Alternatively, two or more of the plurality of supporters at a border of the metal patch may be shorting pins, and the remaining supporters may be configured as non-metal supporters. Meanwhile, according to an example, the cone antenna with a single-cone structure in FIG. 5B may be implemented as H×L×W=0.07×0.34×0.34λ with respect to the height (H), the length (L), and the width (W).

Accordingly, the cone antenna 1100 having a multi-cone structure according to the present disclosure in FIG. 5A has an advantage capable of operating in a wide frequency band while hardly increasing the size. Specifically, there is an advantage in that the hybrid cone antenna 1100 can operate in both first and second frequency bands, that is, up to 5 GHz in a low frequency band. Accordingly, the cone antenna 1100 with a multi-cone structure may operate in both bands of LTE and 5G sub-6 bands.

Specifically, the cone antenna 1100 with a multi-cone structure according to the present disclosure is provided with two or more cone radiators inside one metal patch 1101 for a broadband operation. As described above, an offset feeding method may be used to use two or more cone radiators inside one metal patch 1101.

Meanwhile, the shapes of the first and second cone radiators 1100R1, 1100R2 have the following technical characteristics.

1) A hollow cone radiator is used instead of a solid cone radiator to lower the unit price while reducing a weight of the antenna.

2) For a mechanical connection structure with a metal patch, the cone radiator uses a multi-wing structure having a plurality of outer rims that can be fastened to the metal patch on a substrate.

3) A method of using a screw and a method of using a protrusion structure for a cone radiator fixing part may both be considered.

Referring to FIG. 5A, the metal patch 1101 (region) may include a first dielectric region 1121 and a second dielectric region 1122. Furthermore, the cone antenna 1100 may be shown to include a first dielectric region 1121 and a second dielectric region 1122. Here, the first dielectric region 1121 and the second dielectric region 1122 denote regions in which the metal patch 1101 is not disposed on the first substrate S1.

Specifically, the first dielectric region 1121 is configured to remove metal from a region in which the first upper aperture of the first cone radiator 1100R1 is disposed. Meanwhile, the second dielectric region 1122 is configured remove metal from a region in which the second upper aperture of the second cone radiator 1100R2 is disposed. In this regard, a diameter of the second upper aperture may be smaller than that of the first upper aperture. Accordingly, a first signal in a first frequency band may be radiated through the first cone antenna (i.e., first cone radiator 1100R1). In addition, ta second signal in a second frequency band higher than the first frequency band may be controlled to be radiated through the second cone antenna (i.e., second cone radiator 1100R2).

Meanwhile, in the cone antenna 1100 with a multi-cone structure according to the present disclosure, the metal patch 1101 may be defined as a circular patch to correspond to the first and second upper apertures. However, the present disclosure is not limited thereto, and the metal patch 11101 may be implemented as a rectangular patch or a metal patch having any polygonal structure depending on the application.

On the other hand, referring to FIG. 5A, the first dielectric region 1121 of the circular patch 1101 may be disposed to surround the first upper aperture. On the contrary, the second dielectric region 1122 of the circular patch 1101 may be disposed at one side of the second upper aperture. Accordingly, the first cone radiator 1100R1 may be implemented such that the metal patches 1101 are disposed at both sides of the first upper aperture. On the contrary, the second cone radiator 1100R2 may be implemented such that the metal patch 1101 is disposed only at one side of the second upper aperture.

Figure 6A:
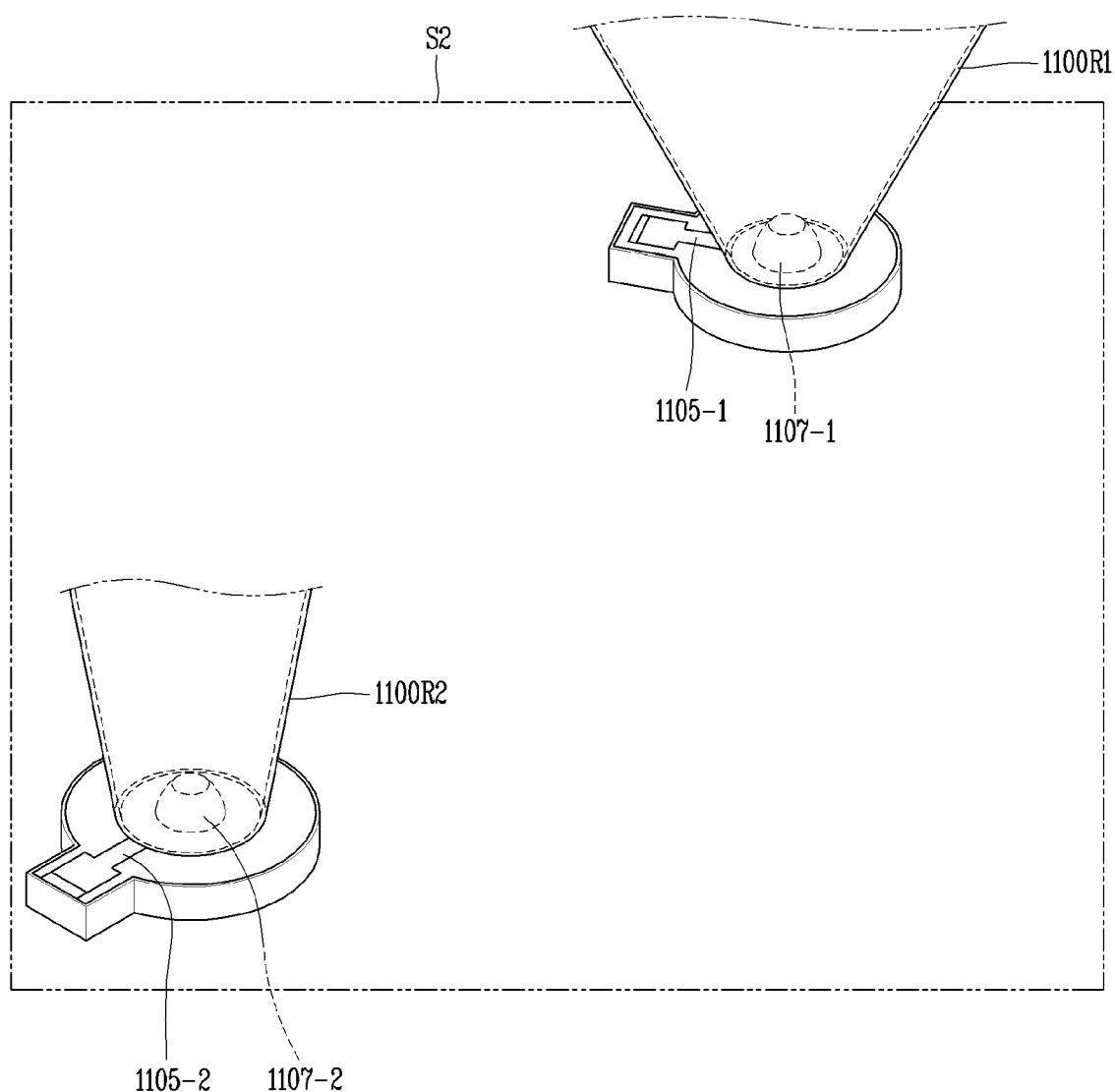
FIG. 6A shows a fastening structure between the cone antenna and a power feeder that feeds power to the cone antenna according to the present disclosure.

Meanwhile, in the hybrid cone antenna 1100 with a multi-cone structure according to the present disclosure, the lower aperture may be connected to each power feeder. In this regard, FIG. 6A shows a fastening structure between the cone antenna and a power feeder that feeds power to the cone antenna according to the present disclosure. On the contrary, FIG. 6B shows a power feeder corresponding to a shape of the cone antenna, which feeds power to the cone antenna according to the present disclosure.

Figure 6B:
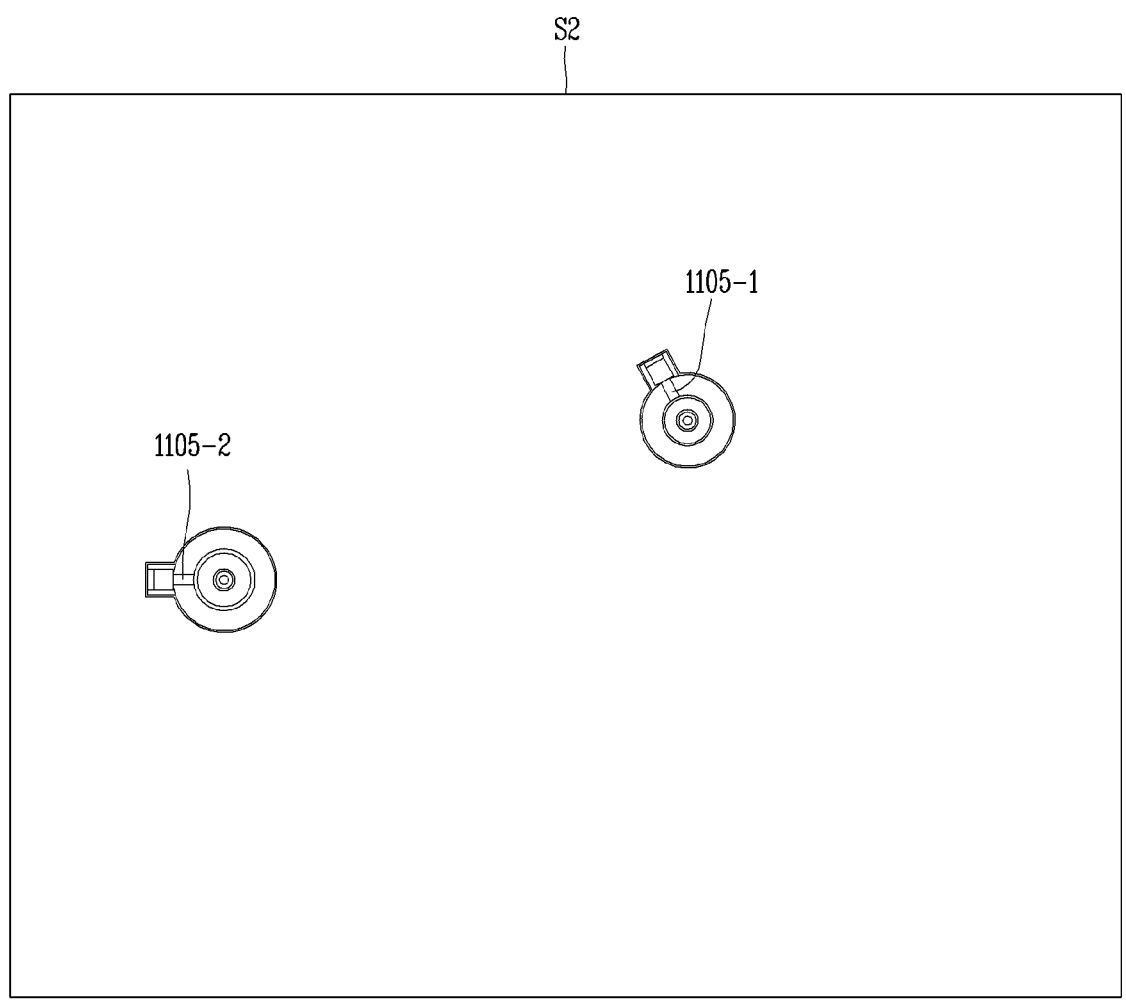
FIG. 6B shows a power feeder corresponding to a shape of the cone antenna, which feeds power to the cone antenna according to the present disclosure.

Referring to FIGS. 6A and 6B, the power feeder 1105 may be disposed on the second substrate, which is a lower substrate, in a shape corresponding to that of the cone radiator 1100R1, 1100R2. In this regard, the power feeder 1105 may be configured to include a first power feeder 1105-1 and a second power feeder 1105-2.

Specifically, the first power feeder 1105-1 is disposed on the second substrate S2, and configured to transmit a signal to the first cone radiator 1100R1 through the lower aperture. On the contrary, the second power feeder 1105-2 is disposed on the second substrate S2, and configured to transmit a signal to the second cone radiator 1100R2 through the lower aperture. In this regard, the first power feeder 1105-1 may be disposed on the second substrate S2 to transmit a signal to the first cone radiator 1100R1 through the lower aperture, thereby radiating the signal through the first upper aperture of the first cone radiator 1100R1 and the metal patch 1100. On the contrary, the second power feeder 1105-2 is disposed on the second substrate S2 to transmit a signal to the second cone radiator 1100R2 through the lower aperture, thereby radiating the signal through the second upper aperture of the second cone radiator 1100R2 and the metal patch 1101.

On the other hand, end portions of the first power feeder 1105-1 and the second power feeder 1105-2 may be defined in ring shapes so as to correspond to the shapes of the first cone radiator 1100R1 and the second cone radiator 1100R2, respectively. In other words, in the hybrid cone antenna 1100 with a multi-cone structure according to the present disclosure, a stable feed contact structure between the lower apertures of the first and second cone radiators 1100R1, 1100R2 and the power feeder may be implemented through a ring-type pad structure.

Accordingly, referring to FIGS. 5A, 6A and 6B, a transceiver circuit 1250 may be configured to be connected to the first and second cone radiators 1100R1, 1100R2 through the first and second power feeders 1105-1, 1105-2, respectively. Accordingly, the transceiver circuit 1250 may control a first signal in a first frequency band to be radiated through the first cone antenna (i.e., first cone radiator 1100R1). In addition, the transceiver circuit 1250 may control a second signal in a second frequency band higher than the first frequency band to be radiated through the second cone antenna (i.e., second cone radiator 1100R2).

Figure 7:
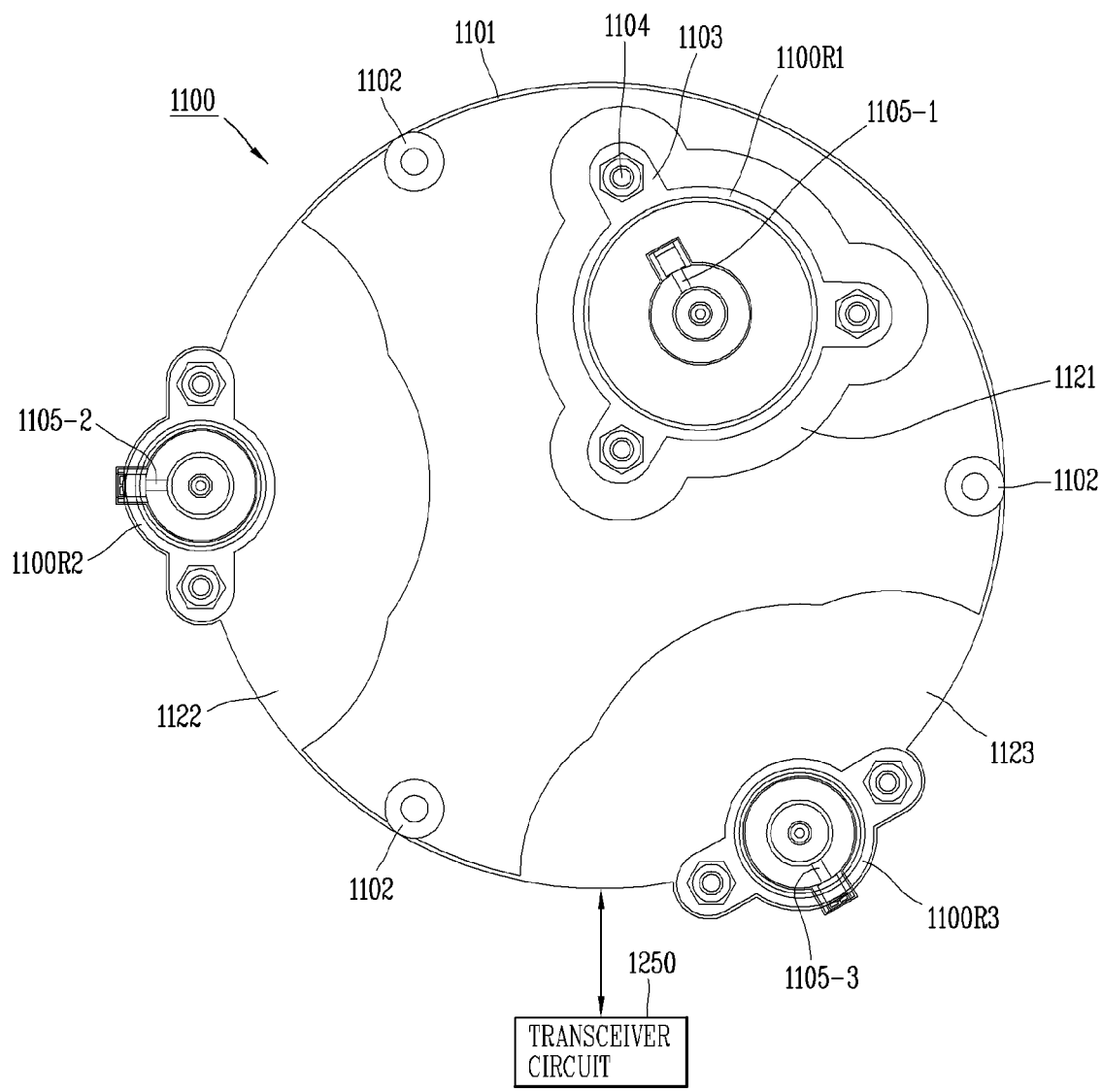
FIG. 7 shows a front view of a cone antenna with a multi-cone structure according to another embodiment of the present disclosure.

On the other hand, FIG. 7 shows a front view of a cone antenna with a multi-cone structure according to another embodiment of the present disclosure. In this regard, referring to FIG. 7, the cone antenna 1100 with a multi-cone structure according to the present disclosure is provided with two or more cone radiators inside one metal patch 1101 for a broadband operation. As described above, an offset feeding method may be used to use three or more cone radiators inside one metal patch 1101.

Referring to FIG. 7, the metal patch 1101 (region) may include a first dielectric region 1121 to a third dielectric region 1123. Furthermore, the cone antenna 1100 may be shown to include a first dielectric region 1121 to a third dielectric region 1123. Here, the first dielectric region 1121 to the third dielectric region 1123 denote regions in which the metal patch 1101 is not disposed on the first substrate S1.

Specifically, the first dielectric region 1121 is configured to remove metal from a region in which the first upper aperture of the first cone radiator 1100R1 is disposed. Meanwhile, the second dielectric region 1122 is configured remove metal from a region in which the second upper aperture of the second cone radiator 1100R2 is disposed. Furthermore, the third dielectric region 1123 is configured remove metal from a region in which the third upper aperture of the third cone radiator 1100R3 is disposed.

In this regard, diameters of the second upper aperture and the third upper aperture may be smaller than that of the first upper aperture. Accordingly, a first signal in a first frequency band may be radiated through the first cone antenna (i.e., first cone radiator 1100R1). In addition, ta second signal in a second frequency band higher than the first frequency band may be controlled to be radiated through the second cone antenna (i.e., second cone radiator 1100R2). In addition, a third signal in a second frequency band (or third frequency band) higher than the first frequency band may be controlled to be radiated through the third cone antenna (i.e., third cone radiator 1100R3).

In this regard, the second cone radiator 1100R2 and the third cone radiator 1100R3 may be disposed to have substantially the same diameter to perform multi-input multi-output (MIMO) in the second frequency band, which is the same frequency band. On the contrary, the second cone radiator 1100R2 and the third cone radiator 1100R3 may be disposed to have different diameters to operate in different second and third frequency bands.

Accordingly, there is an advantage in that the cone antenna 1100 with a multi-cone structure having three or more radiators according to the present disclosure may be configured to operate in a broadband within a limited area than a case where the cone antenna 1100 includes one or two radiators. Furthermore, there is an advantage in that the cone antenna 1100 with a multi-cone structure having three or more radiators according to the present disclosure may perform multi-input multi-output (MIMO) within a limited area. In addition, there is an advantage in that the cone antenna 1100 with a multi-cone structure having three or more radiators according to the present disclosure may perform multi-input multi-output (MIMO) in part of the band as well as a broadband operation within a limited area.

Meanwhile, in the cone antenna 1100 with a multi-cone structure according to the present disclosure, the metal patch 1101 may be defined as a circular patch to correspond to the first to third upper apertures, respectively. However, the present disclosure is not limited thereto, and the metal patch 11101 may be implemented as a rectangular patch or a metal patch having any polygonal structure depending on the application.

On the other hand, referring to FIG. 5A, the first dielectric region 1121 of the circular patch 1101 may be disposed to surround the first upper aperture. On the contrary, the second dielectric region 1122 of the circular patch 1101 may be disposed at one side of the second upper aperture. Furthermore, the third dielectric region 1123 of the circular patch 1101 may be disposed at one side of the third upper aperture.

Accordingly, the first cone radiator 1100R1 may be implemented such that the metal patches 1101 are disposed at both sides of the first upper aperture. On the contrary, the second cone radiator 1100R2 may be implemented such that the metal patch 1101 is disposed only at one side of the second upper aperture. Furthermore, the third cone radiator 1100R3 may be implemented such that the metal patch 1101 is disposed only at one side of the third upper aperture.

In this regard, an upper part of the third cone radiator 1100R3 is also connected to the first substrate S1, and a lower part thereof is connected to the second substrate S2, and the third cone radiator 1100R3 may include an upper aperture on the upper part. Accordingly, the metal patch 1101 may further include the third dielectric region 1123 from which metal is removed in a region where the third upper aperture is disposed. Accordingly, the first to third upper apertures may be disposed adjacent to the metal patch 1101 to share the metal patch 1101.

Accordingly, the first to third upper apertures are disposed inside a diameter of the metal patch 1101. Accordingly, the first to third dielectric regions 1121 to 1123 of the metal patch 1101 may be disposed to surround the first to third upper apertures, respectively.

Specifically, the first upper aperture may be disposed inside a diameter of the metal patch 1101, and the first dielectric region 1121 of the metal patch 1101 may be disposed to surround the first upper aperture. On the contrary, a partial region of the second upper aperture and the third upper aperture are disposed outside the diameter of the metal patch 1101. Accordingly, the second dielectric region 1122 and the third dielectric region 1123 may be disposed at one side of the second upper aperture and the third upper aperture.

Figure 8A:
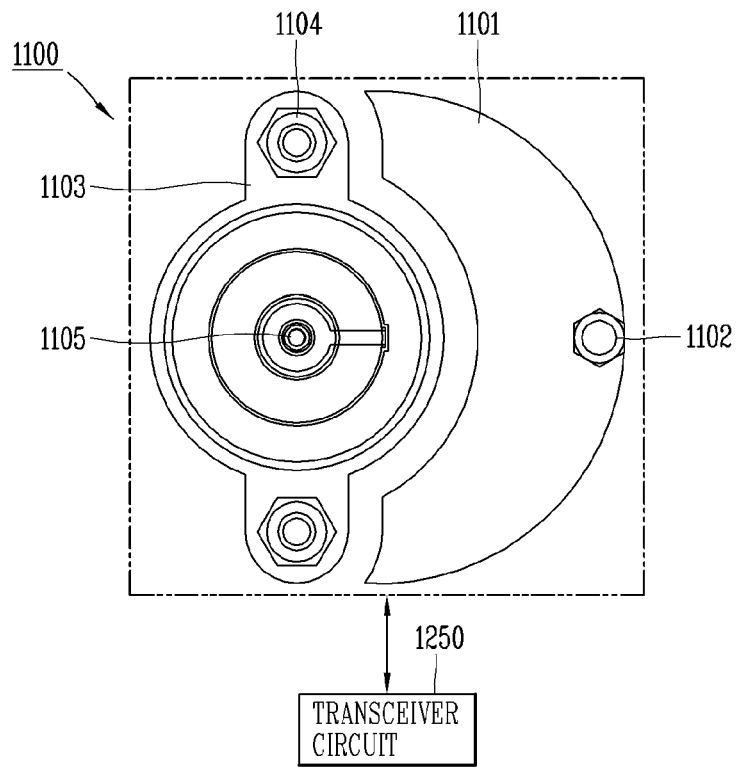
FIGS. 8A and 8B are front views showing a cone antenna having a structure of a cone with a single shorting pin according to various embodiments of the present disclosure.
Figure 8B:
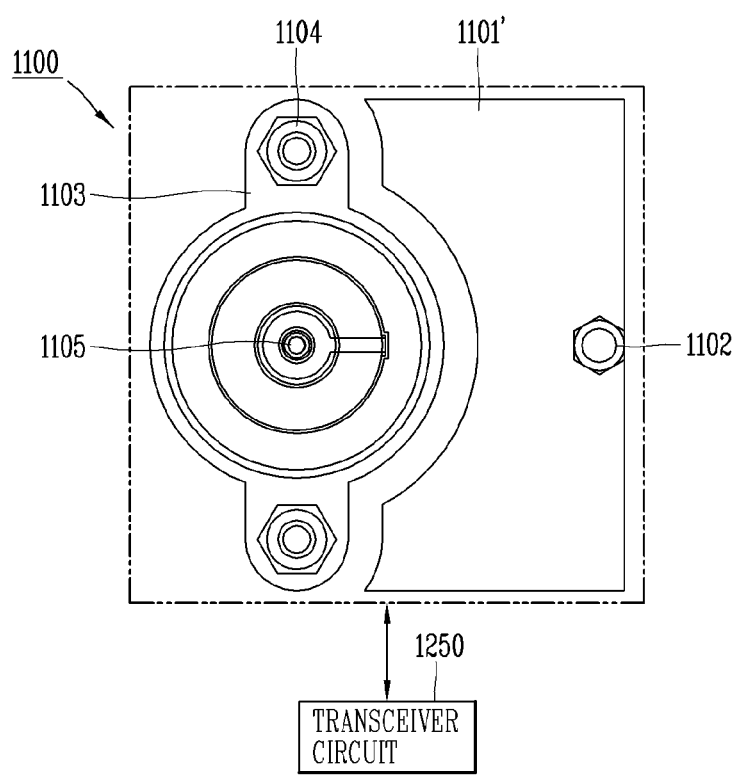

On the other hand, FIGS. 8A and 8B are front views showing a cone antenna having a structure of a cone with a single shorting pin according to various embodiments of the present disclosure. In other words, FIGS. 8A and 8B show a cone antenna implemented by one radiator with a single shorting pin. Here, when the metal patch 1101, 1101' is disposed only at one side as shown in FIGS. 8A and 8B, the cone radiator may correspond to the second cone radiator 1100R2 in FIG. 5A and the third cone radiator 1100R3 in FIG. 7, respectively.

Meanwhile, a cone structure with a single shorting pin as shown in FIGS. 8A and 8B is a cone antenna that is implemented by a single shorting pin (or a shorting supporter). Specifically, FIG. 8A shows a shape in which a metal patch having a circular shape is disposed on one side of an upper opening of the cone radiator. On the contrary, FIG. 8B shows a shape in which a rectangular metal patch is disposed on one side of the upper opening of the cone radiator.

Referring to FIGS. 8A and 8B, an electronic device according to the present disclosure includes the cone antenna 1100. Furthermore, the electronic device may further include a transceiver circuit 1250.

Meanwhile, referring to FIGS. 8A and 8B, the cone antenna 1100 is disposed between a first substrate, which is an upper substrate, and a second substrate, which is a lower substrate. On the other hand, the cone antenna 1100 may include metal patches 1101, 1101', 1101a, 1101b, and the shorting pin 1102. Here, the metal patch 1101 may be disposed in a surrounding region of one side of the upper aperture of the cone antenna 1100. In this regard, the metal patch 1101 may be disposed on the first substrate. Here, the cone antenna 1100 may refer to only a hollow cone antenna or refer to an entire antenna structure including the metal patch 1101.

Specifically, the metal patches 1101, 1101', 1101a, 1101b may be disposed in a surrounding region of the upper aperture of the cone antenna 1100, and disposed above the first substrate. Accordingly, the metal patch 1101 may be disposed at a position spaced apart from the upper aperture of the cone antenna 1100 in a z-axis by a thickness of the first substrate. As such, when the metal patch 1101 is disposed above the first substrate, there is an advantage in that a size of the cone antenna 1100 can be further reduced. Specifically, since the first substrate having a predetermined dielectric constant is disposed in an upper region of the cone antenna 1100 including the metal patch 1101, there is an advantage in that the size of the cone antenna 1100 can be further reduced.

Alternatively, the metal patches 1101, 1101', 1101a, 1101b may be disposed in a surrounding region of the upper aperture of the cone antenna 1100, and disposed below the first substrate. Accordingly, the metal patch 1101 may be spaced apart from the upper aperture of the cone antenna 1100 by a predetermined gap on the same plane on the z-axis. When the metal patch 1101 is disposed below the first substrate as described above, the first substrate may operate as a radome of the cone antenna 1100 including the metal patch 1101. Accordingly, there is an advantage in that the cone antenna 1100 including the metal patch 1101 can be protected from the outside and a gain of the cone antenna 1100 can be increased.

The shorting pin 1102 is configured to connect between the metal patch 1101, 1101', 1101a, 1101b and the ground layer GND disposed on the second substrate. As such, there is an advantage in that the size of the cone antenna 1100 can be reduced by the shorting pin 1102 configured to connect between the metal patch 1101 and the ground layer GND disposed on the second substrate. Meanwhile, the number of shorting pins 1102 may be one or two. A case where the number of shorting pins 1102 is one may be most advantageous in terms of reducing the size of the cone antenna 1100. Accordingly, the shorting pin 1102 may be configured with a single shorting pin between the metal patch and the second substrate, which is a lower substrate. However, the number of shorting pins may not be limited thereto, and two or more shorting pins may be used in terms of performance and structural stability of the cone antenna 1100. Depending on the application, some pins other than the shorting pin 1102 may be implemented as non-metal supporting pins in a non-metallic form.

The transceiver circuit 1250 may be connected to the cone radiator 1100R through the power feeder 1105, and may control a signal to be radiated through the cone antenna 1100. In this regard, the transceiver circuit 1250 may include a power amplifier 210 and a low-noise amplifier 310 at a front stage as shown in FIG. 2. Accordingly, the transceiver circuit 1250 may control the power amplifier 210 to radiate a signal amplified through the power amplifier 210 through the cone antenna 1100. Furthermore, the transceiver circuit 1250 may control the low noise amplifier 310 to amplify a signal received from the cone antenna 1100 through the low noise amplifier 310. In addition, the transceiver circuit 1250 may control elements inside the transceiver circuit 1250 to transmit and/or receive a signal through the cone antenna 1100.

In this regard, when the electronic device includes a plurality of cone antennas, the transceiver circuit 1250 may control a signal to be transmitted and/or received through at least one of the plurality of cone antennas. A case where the transceiver circuit 1250 transmits or receives a signal through only one cone antenna may be referred to as 1 Tx or 1 Rx, respectively. On the contrary, a case where the transceiver circuit 1250 transmits or receives a signal through two or more cone antennas may be referred to as n Tx or n Rx depending on the number of antennas.

For example, a case where the transceiver circuit 1250 transmits or receives a signal through two cone antennas may be referred to as 2 Tx or 2 Rx. However, a case where the transceiver circuit 1250 transmits or receives first and second signals having the same data through two cone antennas may be referred to as 1 Tx or 2 Rx. A case where the transceiver circuit 1250 transmits or receives the first and second signals having the same data through the two cone antennas as described above may be referred to as a diversity mode.

On the other hand, the metal patch 1101 may have a circular patch form as shown in FIG. 5A.

Furthermore, the metal patch 1101 may have a rectangular patch form as shown in FIG. 5B. In this regard, the metal patch 1101 may be implemented in a circular patch form or any polygonal patch form from the viewpoint of antenna downsizing and performance depending on the application. In this regard, any polygonal patch form may be approximated to a circular patch form as the order of the polygon increases.

Referring to FIG. 5A, the metal patch 1101 may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101, thereby having an advantage capable of optimizing the performance of the antenna.

Referring to FIG. 8B, the metal patch 1101' may be defined as a rectangular patch having an outer side shape in a rectangular form. On the other hand, an inner side shape of the rectangular patch may be defined in a circular shape to correspond to the shape of the outer line of the upper aperture. Accordingly, the signal radiated from the cone antenna may be formed to be coupled through an inner side of the rectangular patch 1101, thereby having an advantage capable of optimizing the performance of the antenna.

Meanwhile, a resonance length may be defined by an aperture of the metal patch 1101, 1101' having an aperture size larger than that of the upper aperture of the cone antenna. Accordingly, a signal radiated from the cone antenna 1100 may be coupled through an inner side of the metal patch 1101, 1101'. Accordingly, there is an advantage in that a size of the cone antenna 1100 can be reduced by the aperture of the metal patch 1101, 1101' having an aperture size larger than that of the upper aperture of the cone antenna.

In this regard, in the structure of a cone with a single shorting pin shown in FIGS. 8A and 8B, a length and a width, that is, L×W, of the cone antenna 1100, may be implemented as 0.13×0.14λ. Accordingly, the size can be reduced to about ¼ times that of 0.5λ, which is a size of a general patch antenna. On the other hand, the size can be reduced to about ½ times that of 0.25λ, which is a size of a patch antenna having a shorting pin. In this regard, since the length and width, that is, L×W, of the cone antenna 1100 including the metal patch 1101 is 0.13×0.14λ, a size of the upper aperture of the cone antenna 1100 can be implemented to be smaller than that.

Accordingly, in the cone antenna 1100 according to the present disclosure, the metal patch 1101 may be disposed in only a partial region to surround a partial region of the upper aperture of the cone antenna 1100. As a result, there is an advantage in that the size of the cone antenna 1100 including the metal patch 1101 can be minimized.

Furthermore, the height, length, and width, that is, H×L× W, of the cone antenna 1100 may be implemented as 0.06×0.13×0.14λ. Accordingly, the cone antenna 1100 according to the present disclosure including the metal patch 1101 and the shorting pin 1102 has an advantage in that the height can be reduced compared to a cone antenna in the related art. Accordingly, the cone antenna 1100 having the metal patch 1101 and the shorting pin 1102 according to the present disclosure has an advantage capable of reducing a height of the antenna on the z-axis as well as reducing a size of the antenna on an xy-plane.

Figure 9A:
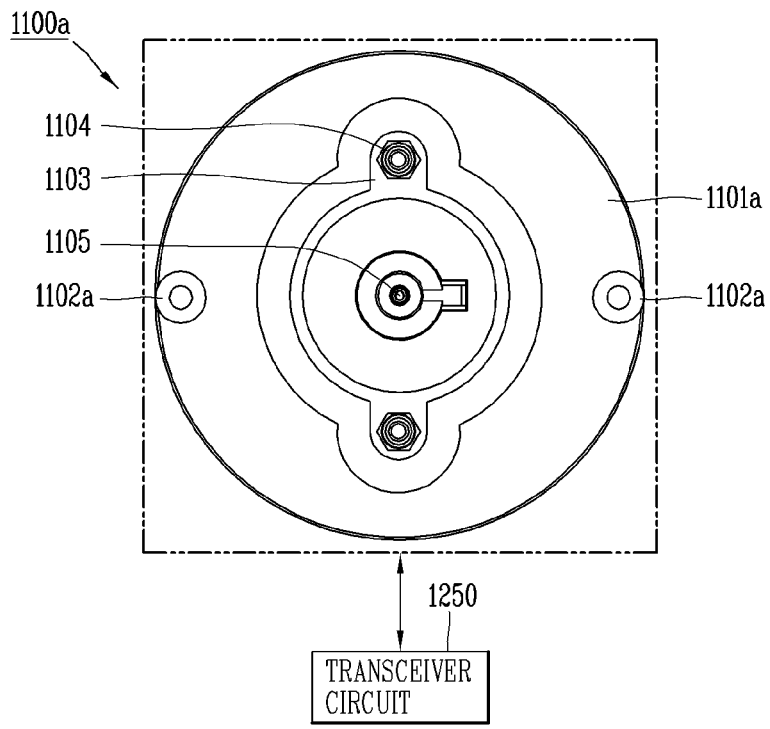
FIGS. 9A and 9B show front views of a cone antenna including a circular patch and shorting pins according to another embodiment of the present disclosure.
Figure 9B:
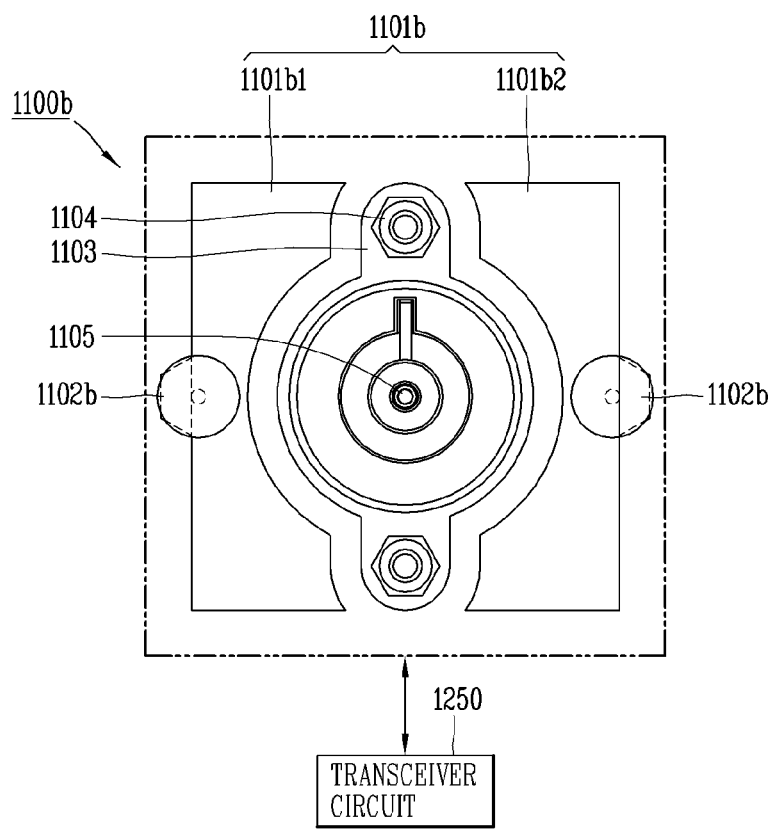

Meanwhile, FIGS. 9A and 9B show front views of a cone antenna including a circular patch and shorting pins according to another embodiment of the present disclosure. In other words, FIGS. 9A and 9B show a cone antenna implemented by one radiator and a single shorting pin. Here, when the metal patches 1101a, 1101b are disposed at both sides as shown in FIGS. 9A and 9B, the cone radiator may correspond to the first cone radiator 1100R1 in FIG. 5A.

In FIG. 9A, the cone antenna 1100a may include a circular patch 1101a and two shorting pins 1102a. On the other hand, the cone antenna 1100a may connect the first substrate and the second substrate with two shorting pins 1102a and the remaining non-metal supporting pins.

In this regard, FIGS. 6A and 6B are views showing an electronic device provided with a cone antenna having a structure of a cone with two shorting pins according to an embodiment of the present disclosure. In this regard, the structure of a cone with two shorting pins is a cone antenna implemented by two shorting pins (or shorting supporters). Here, the structure of FIGS. 6A and 6B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102a of FIG. 6A may be replaced with the non-metal supporter 1106 of FIG. 4A. Accordingly, one of the non-metal supporters 1106 may be disposed in a metal patch disposed on the other side.

Referring to FIGS. 9A and 9B, the electronic device according to the present disclosure includes the cone antenna 1100a. Furthermore, the electronic device may further include the transceiver circuit 1250.

Meanwhile, referring to FIGS. 4A to 9B, the cone antenna 1100a is disposed between a first substrate, which is an upper substrate, and a second substrate, which is a lower substrate. Meanwhile, the cone antenna 1100a may include a metal patch 1101a and the shorting pin 1102a. Here, the metal patch 1101a may be disposed in a surrounding region of the upper aperture of the cone antenna 1100a. In this regard, the metal patch 1101 may be disposed on the first substrate.

On the other hand, the metal patch 1101a may be implemented as a circular patch to surround the entire upper aperture of the cone antenna 1100a. However, the present disclosure is not limited thereto, and the metal patch 1101a may be implemented as a circular patch that surrounds a part of the upper aperture of the cone antenna 1100a. Accordingly, the circular patch may be disposed at both sides of the upper aperture of the cone antenna 1100a or may be disposed at one side thereof.

Accordingly, in the cone antenna 1100a according to the present disclosure, the circular patch 1101a may be disposed in an entire region to surround an entire region of the upper aperture of the cone antenna 1100a. Specifically, a metal patch such as the circular patch 1101a may be disposed at both one side and the other side corresponding to the one side so as to surround the entire region of the upper opening of the cone antenna.

Accordingly, the cone antenna 1100a having the symmetrical circular patch 1101a and the shorting pins 1102a may have a slightly increased overall size compared to a case where the metal patch disposed at only one side thereof is provided. However, the cone antenna 1100a having the symmetrical circular patch 1101a and the shorting pin 1102a has an advantage in that the radiation pattern is symmetrical and can be implemented with broadband characteristics.

On the other hand, in the cone antenna 1100a according to the present disclosure, the circular patch 1101a may be disposed in only a partial region to surround a partial region of the upper aperture. Accordingly, there is an advantage in that the size of the cone antenna 1100a including the metal patch 1101a can be minimized.

Specifically, the metal patch 1101a may be disposed in a surrounding region of the upper aperture of the cone antenna 1100a, and disposed above the first substrate. Accordingly, the metal patch 1101a may be disposed at a position spaced apart from the upper aperture of the cone antenna 1100a in the z-axis by a thickness of the first substrate. As such, when the metal patch 1101a is disposed above the first substrate, there is an advantage in that a size of the cone antenna 1100a can be further reduced. Specifically, since the first substrate having a predetermined dielectric constant is disposed in an upper region of the cone antenna 1100 including the metal patch 1101a, there is an advantage in that the size of the cone antenna 1100 can be further reduced.

Alternatively, the metal patch 1101 may be formed in a peripheral area of the upper aperture of the cone antenna 1100a and disposed under the first substrate. Accordingly, the metal patch 1101a may be spaced apart from the upper aperture of the cone antenna 1100a by a predetermined gap on the same plane on the z-axis. When the metal patch 1101a is disposed below the first substrate as described above, the first substrate may operate as a radome of the cone antenna 1100a including the metal patch 1101a. Accordingly, there is an advantage in that the cone antenna 1100a including the metal patch 1101a can be protected from the outside and a gain of the cone antenna 1100a can be increased.

The shorting pin 1102a is configured to connect between the metal patch 1101a and the ground layer GND disposed on the second substrate. As such, there is an advantage in that the size of the cone antenna 1100a can be reduced by the shorting pin 1102a configured to connect between the metal patch 1101a and the ground layer GND disposed on the second substrate.

The transceiver circuit 1250 may be connected to the cone antenna 1100b to control a signal to be radiated through the cone antenna 1100b. The detailed description related thereto will be replaced with the description in FIGS. 5A and 5B.

Referring to FIG. 6A, the metal patch 1101a may be defined as a circular patch having an outer side shape in a circular form. Meanwhile, an inner side shape of the circular patch may be defined in a circular shape to correspond to a shape of an outer line of the upper aperture. Accordingly, a signal radiated from the cone antenna may be formed to be coupled through an inner side of the circular patch 1101a, thereby having an advantage capable of optimizing the performance of the antenna.

Meanwhile, a resonance length may be defined by an aperture of the metal patch 1101a having an aperture size larger than that of the upper aperture of the cone antenna. Accordingly, a signal radiated from the cone antenna 1100a may be coupled through an inner side of the circular patch 1101a. Accordingly, there is an advantage in that a size of the cone antenna 1100a can be reduced by the aperture of the circular patch 1101a having an aperture size larger than that of the upper aperture of the cone antenna.

In this regard, in the structure of a cone with two shorting pins on the circular patch shown in FIG. 9A, a length and a width, that is, L×W, of the cone antenna 1100a, may be implemented as 0.22×0.22λ. Accordingly, the size can be reduced to about ½ times that of 0.5λ, which is a size of a general patch antenna. On the other hand, the antenna can be implemented with a size smaller than 0.25λ, which is a size of a patch antenna having a shorting pin. In this regard, since the length and width, that is, L×W, of the cone antenna 1100a including the circular patch 1101a is 0.22×0.22λ, a size of the upper aperture of the cone antenna 1100a can be implemented to be smaller than that.

Furthermore, the height, length, and width, that is, H×L× W, of the cone antenna 1100a may be implemented as 0.07×0.22×0.22λ. Accordingly, the cone antenna 1100a according to the present disclosure including the circular patch 1101a and the shorting pin 1102a has an advantage in that the height can be reduced compared to a cone antenna in the related art. Accordingly, the cone antenna 1100a having the circular patch 1101a and the shorting pin 1102a according to the present disclosure has an advantage capable of reducing a height of the antenna on the z-axis as well as reducing a size of the antenna on an xy-plane.

On the other hand, FIG. 9B is a view showing an electronic device provided with a cone antenna having a structure of a cone with two shorting pins according to another embodiment of the present disclosure. In this regard, the structure of a cone with two shorting pins is a cone antenna implemented by two shorting pins (or shorting supporters). Here, the structure of FIGS. 9A and 9B is not limited to the structure of a cone with two shorting pins, and may be a structure of a cone with a single shorting pin. In this regard, one of the two support structures may be implemented as a shorting pin and the other one as a non-metal supporter. Specifically, one of the shorting pins 1102b of FIG. 6B may be replaced with the non-metal supporter 1106 of FIG. 4A. Accordingly, one of the non-metal supporters 1106 may be disposed in a metal patch 1101b1 on the other side.

Referring to FIG. 9B, the electronic device according to the present disclosure includes the cone antenna 1100b. Furthermore, the electronic device may further include the transceiver circuit 1250.

Meanwhile, referring to FIGS. 4 to 9B, the cone antenna 1100b is disposed between a first substrate, which is an upper substrate, and a second substrate, which is a lower substrate. Meanwhile, the cone antenna 1100a may include a metal patch 1101b and the shorting pins 1102b. Here, the metal patch 1101b may be disposed in a surrounding region of the upper aperture of the cone antenna 1100b. In this regard, the metal patch 1101 may be disposed on the first substrate.

On the other hand, the metal patch 1101b may be implemented as a rectangular patch to surround the entire upper aperture of the cone antenna 1100b. However, the present disclosure is not limited thereto, and the metal patch 1101b may be implemented as a rectangular patch that surrounds a part of the upper aperture of the cone antenna 1100b. Accordingly, the rectangular patch may be disposed at both sides of the upper aperture of the cone antenna 1100b or may be disposed at one side thereof.

Accordingly, in the cone antenna 1100b according to the present disclosure, the rectangular patch 1101b may be substantially disposed in an entire region to surround a region of the upper aperture of the cone antenna 1100b. In this regard, in order to reduce a size of the rectangular patch 1101b, the rectangular patch 1101b may not be disposed in a region around the fasteners 1104 supporting the cone antenna 1100b. Accordingly, the rectangular patches 1101b may be respectively disposed in left and right regions of the cone antenna 1100b.

In this regard, the metal patch 1101b may include a first metal patch 1101b1 and a second metal patch 1101b2. Specifically, the first metal patch 1101b1 may be disposed at a left side of the upper aperture of the cone antenna 1100b to surround the upper aperture. In addition, the second metal patch 1101b2 may be disposed at a right side of the upper aperture of the cone antenna 1100b to surround the upper aperture.

Accordingly, the first metal patch 1101b and the second metal patch 1101b2 are disposed to allow metal patterns thereof to be separated from each other, thereby reducing an overall size of the antenna. In this regard, when the first metal patch 1101b and the second metal patch 1101b2 are connected to each other, the metal patch 1101b may partially operate as a radiator. Accordingly, the bandwidth may be partially limited by an unwanted resonance due to the effect of the metal patch 1101b having a narrower bandwidth than the cone antenna 1100b.

In order to prevent such bandwidth limitation, the first metal patch 1101b and the second metal patch 1101b2 may be disposed to allow the metal patterns to be separated from each other. Accordingly, the cone antenna 1100b in which the metal patterns are separated from each other by the first metal patch 1101b and the second metal patch 1101b2 may operate as a broadband antenna. Accordingly, the first metal patch 1101b and the second metal patch 1101b2 may not be disposed in a region corresponding to the outer rim 1103 constituting the upper aperture.

Accordingly, the cone antenna 1100b having the symmetrical rectangular patches 1101b and the shorting pins 1102b disposed in left and right regions, respectively, has a slightly increased width compared to a case where the metal patch is disposed only at one side thereof. In this regard, a width W of an asymmetrical rectangular patch structure in FIG. 8B is 0.13λ, whereas a width W of the symmetrical rectangular patch structure in FIG. 9B is 0.14λ. In other words, an increase in the width W of the symmetrical rectangular patch structure is not substantially large. On the other hand, the cone antenna 1100b having the symmetrical rectangular patch 1101b and the shorting pins 1102b has an advantage in that the radiation pattern is symmetrical and can be implemented with broadband characteristics.

Specifically, the rectangular patch 1101b may be disposed in a surrounding region of the upper aperture of the cone antenna 1100b, and disposed above the first substrate.

Accordingly, the metal patch 1101b may be disposed at a position spaced apart from the upper aperture of the cone antenna 1100b in the z-axis by a thickness of the first substrate. As such, when the metal patch 1101b is disposed above the first substrate, there is an advantage in that a size of the cone antenna 1100b can be further reduced. Specifically, since the first substrate having a predetermined dielectric constant is disposed in an upper region of the cone antenna 1100 including the metal patch 1101b, there is an advantage in that the size of the cone antenna 1100b can be further reduced.

Alternatively, the rectangular patch 1101b may be disposed in a surrounding region of the upper aperture of the cone antenna 1100b, and disposed below the first substrate. Accordingly, the metal patch 1101b may be spaced apart from the upper aperture of the cone antenna 1100b by a predetermined gap on the same plane on the z-axis. When the metal patch 1101b is disposed below the first substrate as described above, the first substrate may operate as a radome of the cone antenna 1100b including the metal patch 1101b. Accordingly, there is an advantage in that the cone antenna 1100b including the metal patch 1101b can be protected from the outside and a gain of the cone antenna 1100b can be increased.

The shorting pins 1102b are configured to connect between the metal patch 1101a and the ground layer GND disposed on the second substrate. As such, there is an advantage in that the size of the cone antenna 1100a can be reduced by the shorting pin 1102a configured to connect between the metal patch 1101a and the ground layer GND disposed on the second substrate.

The transceiver circuit 1250 may be connected to the cone antenna 1100b to control a signal to be radiated through the cone antenna 1100b. The detailed description related thereto will be replaced with the description in FIG. 8.

Referring to FIG. 9B, the rectangular patch 1101b may be defined as a rectangular patch having an outer side shape in a rectangular form. Meanwhile, an inner side shape of the rectangular patch may be defined in a circular shape to correspond to a shape of an outer line of the upper aperture. Accordingly, the signal radiated from the cone antenna may be formed to be coupled through an inner side of the rectangular patch 1100b, thereby having an advantage capable of optimizing the performance of the antenna.

Meanwhile, a resonance length may be defined by a circular aperture of the rectangular patch 1101b having an aperture size larger than that of the upper aperture of the cone antenna. Accordingly, a signal radiated from the cone antenna 1100b may be coupled through an inner side of the rectangular patch 1101b. Accordingly, there is an advantage in that a size of the cone antenna 1100b can be reduced by the aperture of the rectangular patch 1101b having an aperture size larger than that of the upper aperture of the cone antenna.

In this regard, in the structure of a cone with two shorting pins on two rectangular patches shown in FIG. 9B, a length and a width, that is, L×W, of the cone antenna 1100b, may be implemented as 0.14×0.14λ. Accordingly, the size can be reduced to about ¼ times that of 0.5λ, which is a size of a general patch antenna. On the other hand, the size can be reduced to about ½ times that of 0.25λ, which is a size of a patch antenna having a shorting pin. In this regard, since the length and width, that is, L×W, of the cone antenna 1100b including the circular patch 1101b is 0.14×0.14λ, a size of the upper aperture of the cone antenna 1100b can be implemented to be smaller than that.

Furthermore, the height, length, and width, that is, H×L×W, of the cone antenna 1100b may be implemented as 0.07×0.14×0.14λ. Accordingly, the cone antenna 1100b according to the present disclosure including the rectangular patch 1101b and the shorting pins 1102b has an advantage in that the height can be reduced compared to a cone antenna in the related art. Accordingly, the cone antenna 1100b having the rectangular patch 1102b and the shorting pins 1102b according to the present disclosure has an advantage capable of reducing a height of the antenna on the z-axis as well as reducing a size of the antenna on an xy-plane.

Figure 10A:
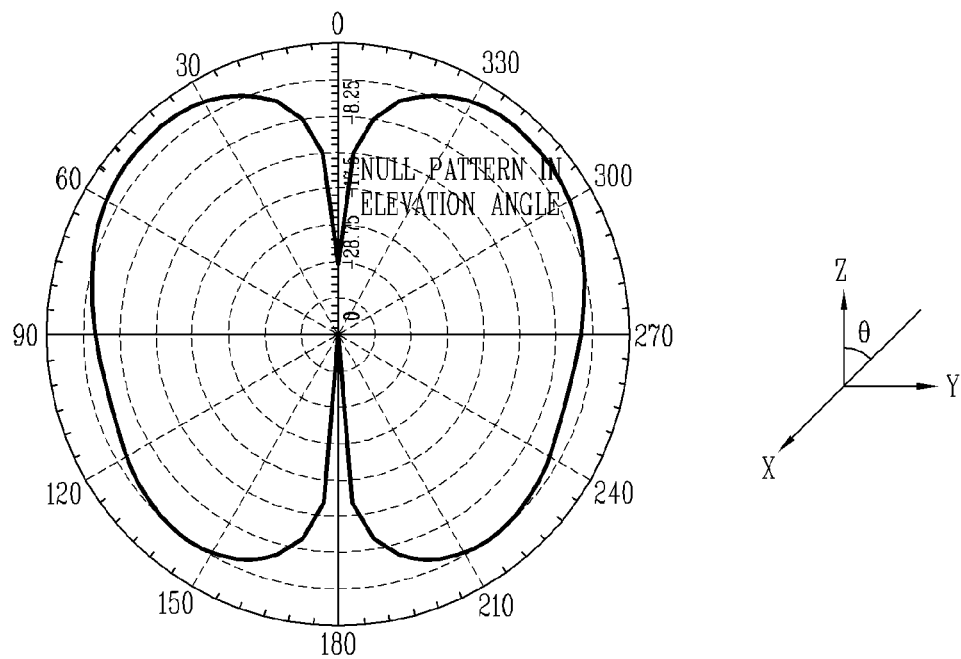
FIG. 10A shows a radiation pattern for a symmetrical structure such as a cone antenna provided with two shorting pins. On the contrary.

On the other hand, the electronic device having the cone antenna according to the present disclosure has excellent reception performance in almost all directions through the cone antenna. Specifically, a radiation pattern of the cone antenna has excellent reception performance even from boresight in the elevation angle direction. In this regard, FIG. 10A shows a radiation pattern for a symmetrical structure such as a cone antenna provided with two shorting pins. On the contrary, FIG. 10B shows a radiation pattern for a structure such as a cone antenna provided with a single shorting pin.

Referring to FIG. 10A, a cone antenna having two shorting pins has a problem in that a null of the radiation pattern is generated from boresight in an elevation angle direction, thereby deteriorating reception performance. In order to solve this problem, in the present disclosure, the null of the radiation pattern may be removed from boresight in an elevation angle direction through a structure in which the cone antenna 1110 is connected to a single shorting pin 1102. In this regard, referring to FIG. 9A, the cone antenna with a single shorting pin forms a current path of the power feeder 1105—the cone radiator 1100R—the metal patch 1101—the shorting pin 1102—the ground layer GND. In this way, through an asymmetric current path of the power feeder 1105—the cone radiator 1100R—the metal patch 1101—the shorting pin 1102—the ground layer GND, a null of the radiation pattern may be prevented from being generated from boresight in the elevation angle direction.

Figure 10B:
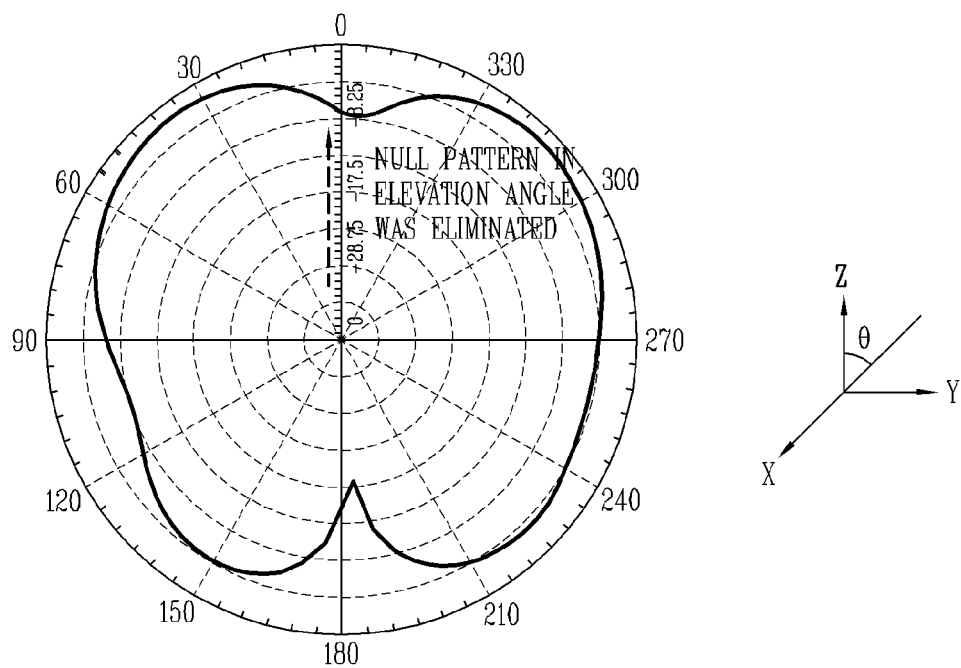
FIG. 10B shows a radiation pattern for a structure such as a cone antenna provided with a single shorting pin.

Referring to FIG. 10B, in the cone antenna having a single shorting pin, the null of the radiation pattern may be removed from boresight in the elevation angle direction. Accordingly, the present disclosure has an advantage in that reception performance can be improved in almost all directions.

In the above, an electronic device employing an antenna structure having two or more cone radiators inside the metal patch 1101 according to an aspect of the present disclosure has been described. Hereinafter, a vehicle employing an antenna structure having two or more cone radiators inside the metal patch 1101 according to another aspect of the present disclosure will be described. In this regard, the foregoing description of a cone antenna having a multi-cone structure may also be applied to a vehicle having a cone antenna having a multi-cone structure.

Figure 11A:
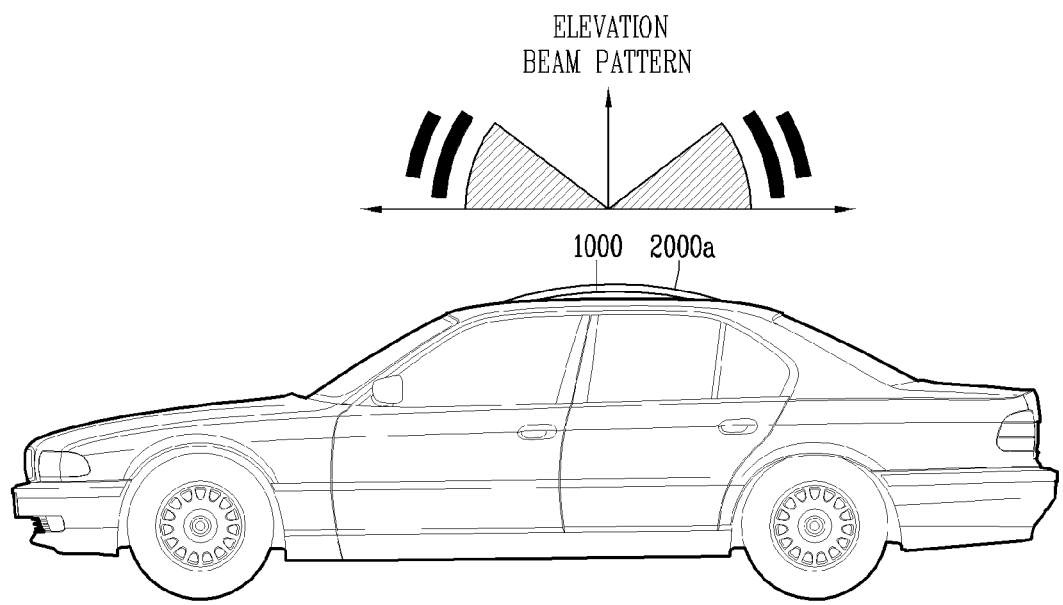
FIGS. 11A and 11B show a structure in which an antenna system can be mounted in a vehicle including the antenna system mounted on the vehicle according to the present disclosure.
Figure 11B:
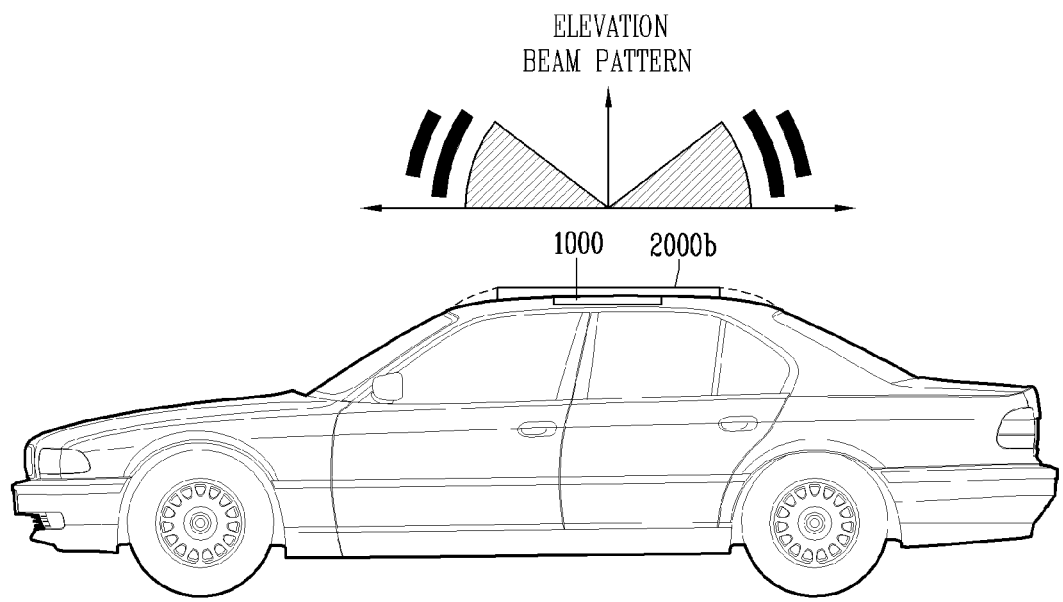

FIGS. 11A and 11B show a structure in which an antenna system can be mounted in a vehicle including the antenna system mounted on the vehicle according to the present disclosure. In this regard, FIG. 11A illustrates a configuration in which an antenna system 1000 is mounted inside a roof of a vehicle. In this regard, a case in which the antenna system 1000 is mounted on the roof of the vehicle may also be included therein. Meanwhile, the antenna system 1000 may be mounted inside the roof of the vehicle and a roof frame of a rear mirror.

Referring to FIGS. 11A and 11B, in the present disclosure, in order to improve an appearance of an automobile (vehicle) and preserve telematics performance in case of a collision, a shark fin antenna in the related art will be replaced with a non-protruding flat antenna. In addition, the present disclosure intends to propose an antenna in which an LTE antenna and a 5G antenna are integrated in consideration of 5G communication along with the provision of the mobile communication service (LTE) in the related art.

Referring to FIGS. 11A and 11B, the antenna system 1000 is configured as a structure, and disposed on a roof of a vehicle. A radome 2000a for protecting the antenna system 1000 from an external environment and an external impact while driving a vehicle may surround the antenna system 1000. The radome 2000a may be made of a dielectric material through which a radio wave signal transmitted and received between the antenna system 1000 and a base station can be transmitted.

Referring to FIG. 11A, the antenna system 1000 may be disposed inside a roof structure of a vehicle, and may be configured such that at least part of the roof structure is implemented with a non-metal. In this case, at least part of the roof structure 2000a of the vehicle may be implemented with a non-metal, and made of a dielectric material through which a radio signal transmitted and received between the antenna system 1000 and the base station can be transmitted.

Furthermore, referring to FIG. 11B, the antenna system 1000 may be disposed inside a roof frame of a vehicle, and at least part of the roof frame may be configured to be implemented with a non-metal. In this case, at least part of the roof frame 2000b of the vehicle may be made of a non-metal, and may be made of a dielectric material through which a radio signal transmitted and received between the antenna system 1000 and the base station may be transmitted.

Figure 12:
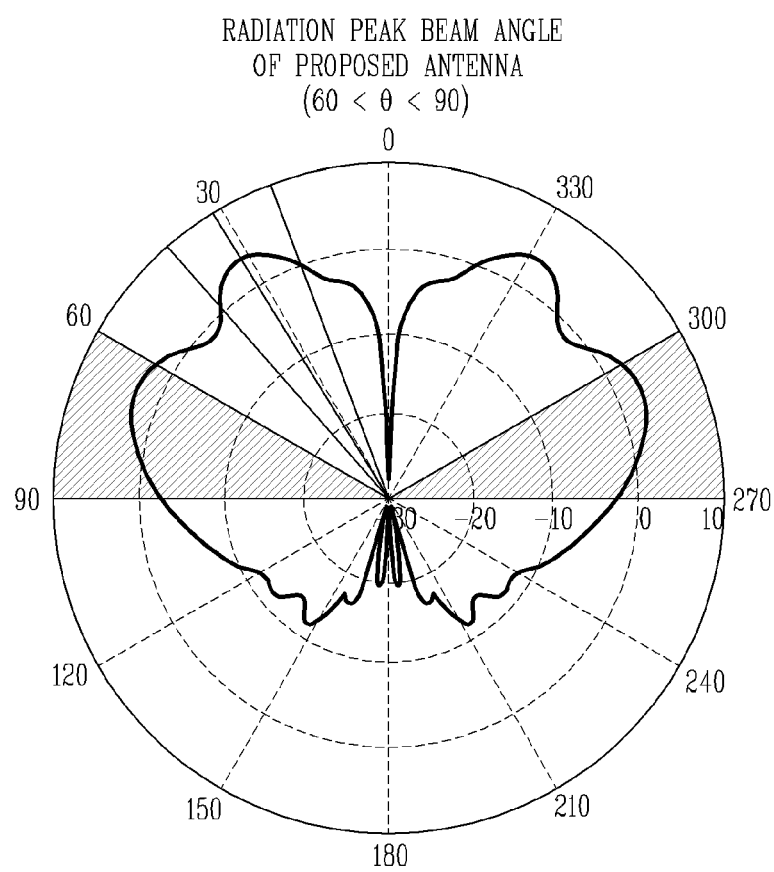
FIG. 12 shows an example of a radiation pattern of a vehicle having a cone antenna with a multi-cone structure in which a plurality of shorting pins are symmetrically provided according to the present disclosure.

Meanwhile, referring to FIGS. 11A and 11B, it may not be important for the vehicle to transmit or receive a signal through boresight in the elevation angle direction. In this regard, the vehicle needs to transmit and/or receive a signal only in a predetermined angular section, for instance, at 30 degrees, in a horizontal direction other than in a vertical direction in the elevation angle direction. In this regard, FIG. 11 shows an example of a radiation pattern of a vehicle having a cone antenna with a multi-cone structure in which a plurality of shorting pins are symmetrically provided according to the present disclosure. Referring to FIGS. 11A, 11B and 12, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

In this regard, a cone antenna having a multi-cone structure according to the present disclosure may be configured with a plurality of shorting pins, thereby implementing symmetry of electrical properties in various directions along with structural stability. In this regard, when configured with a plurality of shorting pins at predetermined angular intervals, the current distribution of the cone antenna having a multi-cone structure is symmetrically formed. Accordingly, there is an advantage in that mobility, in particular, symmetry of electrical characteristics in various directions can be maintained even when changing directions in an electronic device or vehicle provided with a cone antenna having a multi-cone structure. In this regard, when the plurality of shorting pins are symmetrically disposed, a null of the radiation pattern may be generated from boresight in the elevation angle direction. Therefore, in the case of a vehicle, it may not be important to transmit or receive a signal through boresight in the elevation angle direction. In this regard, referring to FIGS. 11A, 11B and 12, a radiation pattern may be mainly formed in the relevant region to allow the vehicle to transmit and/or receive a signal only in a predetermined angular section, for instance, 30 degrees, in a horizontal direction other than in a vertical direction in the elevation angle direction.

Figure 13B:
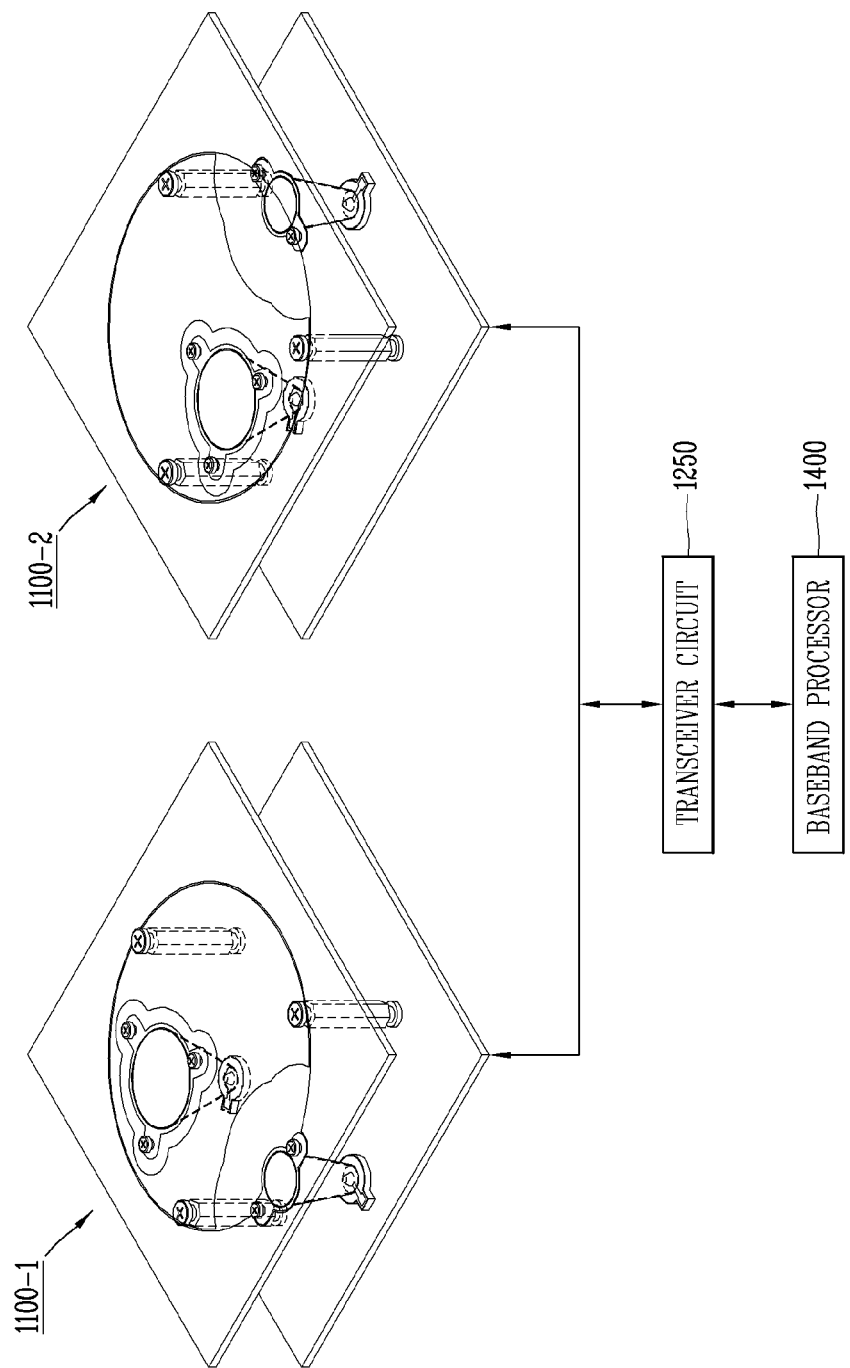
FIG. 13B shows a structure of an electronic device or vehicle having a plurality of cone antennas, a transceiver circuit, and a processor according to an embodiment of the present disclosure.

In an electronic device or vehicle having such a cone antenna with a multi-cone structure, the cone antenna having a multi-cone structure may be implemented as an antenna system including a plurality of cone antennas. In this regard, FIG. 13A shows a shape of an electronic device or vehicle having a plurality of cone antennas according to an embodiment of the present disclosure. Furthermore, FIG. 13B shows a structure of an electronic device or vehicle having a plurality of cone antennas, a transceiver circuit, and a processor according to an embodiment of the present disclosure.

Figure 14A:
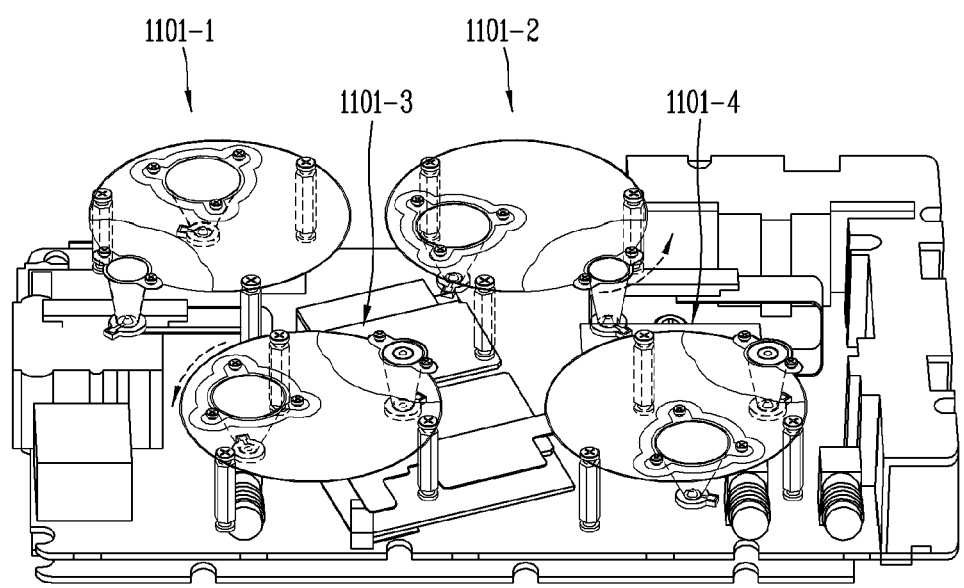
FIG. 14A shows a shape of an electronic device or vehicle having a plurality of cone antennas according to another embodiment of the present disclosure. Furthermore.
Figure 14B:
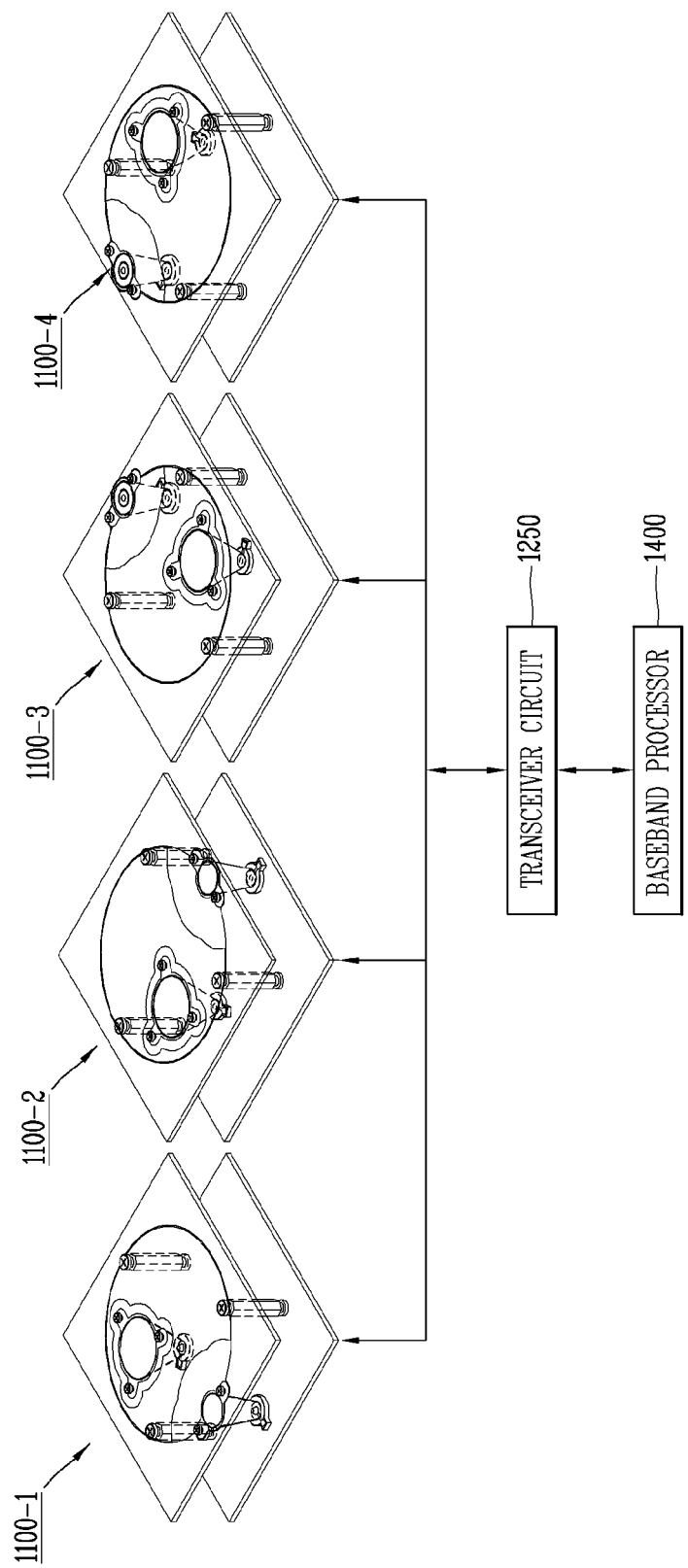
FIG. 14B shows a structure of an electronic device or vehicle having a plurality of cone antennas, a transceiver circuit, and a processor according to another embodiment of the present disclosure.

On the other hand, FIG. 14A shows a shape of an electronic device or vehicle having a plurality of cone antennas according to another embodiment of the present disclosure. Furthermore, FIG. 14B shows a structure of an electronic device or vehicle having a plurality of cone antennas, a transceiver circuit, and a processor according to another embodiment of the present disclosure.

Referring to FIG. 13A, the electronic device or vehicle may include four cone antennas, that is, a first cone antenna 1100-1 and a second cone antenna 1100-2. Here, the number of cone antennas can be changed to various numbers according to applications. Here, the first cone antenna 1100-1 and the fourth cone antenna 1100-4 may be implemented in the same shape for the same antenna performance. In addition, the first cone antenna 1100-1 and the second cone antenna 1100-2 may be implemented in different shapes for optimal antenna performance and an optimal arrangement structure.

Specifically, the second cone antenna 1100-2 may be disposed to be rotated by a predetermined angle with respect to the first cone antenna 1100-1. In this regard, in order to minimize interference between the cone antennas, the second cone antenna 1100-2 may be disposed to be rotated by 90 degrees with respect to the first cone antenna 1100-1. Alternatively, in this regard, in order to minimize interference between the cone antennas, the second cone antenna 1100-2 may be disposed to be rotated by 180 degrees with respect to the first cone antenna 1100-1.

Meanwhile, a plurality of cone antennas as shown in FIG. 13A may be disposed in plurality in a one-dimensional region. In this regard, the plurality of cone antennas may be configured with 2×1 or 4×1 cone antennas. Here, 2 Tx or 4 Tx multi-input multi-output (MIMO) may be implemented through 2×1 or 4×1 cone antennas. In addition, 2 Rx or 4 Rx multi-input multi-output (MIMO) may be implemented through 2×1 or 4×1 cone antennas.

Referring to FIG. 14A, the electronic device or vehicle may include four cone antennas, that is, a first cone antenna 1100-1 to a fourth cone antenna 1100-4. Here, the number of cone antennas can be changed to various numbers according to applications. Here, the first cone antenna 1100-1 to the fourth cone antenna 1100-4 may be implemented in the same shape for the same antenna performance. In addition, the first cone antenna 1100-1 to the fourth cone antenna 1100-4 may be implemented in different shapes for optimal antenna performance and an optimal arrangement structure.

Specifically, the second cone antenna 1100-2 may be disposed to be rotated by a predetermined angle with respect to the first cone antenna 1100-1. In this regard, in order to minimize interference between the cone antennas, the second cone antenna 1100-2 may be disposed to be rotated by 90 degrees with respect to the first cone antenna 1100-1. Alternatively, in this regard, in order to minimize interference between the cone antennas, the second cone antenna 1100-2 may be disposed to be rotated by 180 degrees with respect to the first cone antenna 1100-1.

Furthermore, the fourth cone antenna 1100-4 may be disposed to be rotated by a predetermined angle with respect to the third cone antenna 1100-3. In this regard, in order to minimize interference between the cone antennas, the fourth cone antenna 1100-4 may be disposed to be rotated by 90 degrees with respect to the third cone antenna 1100-3. Accordingly, the first cone antenna 1100-1 to the fourth cone antenna 1100-4 may be sequentially rotated by 90 degrees to each other. Alternatively, in order to minimize interference between the cone antennas, the fourth cone antenna 1100-4 may be disposed to be rotated by 180 degrees with respect to the third cone antenna 1100-3.

Furthermore, the third cone antenna 1100-3 may be disposed to be shifted by a predetermined gap in one axial direction with respect to the first cone antenna 1100-1. Similarly, the fourth cone antenna 1100-4 may be disposed to be shifted by a predetermined gap in one axial direction with respect to the second cone antenna 1100-2. Accordingly, the first cone antenna 1100-1 to the fourth cone antenna 1100-4 may be disposed to minimize interference with each other.

Alternatively, the third cone antenna 1100-3 may be aligned with the first cone antenna 1100-1 in one axial direction to be disposed at substantially the same position. Similarly, the fourth cone antenna 1100-4 may be aligned with the second cone antenna 1100-2 in one axial direction to be disposed at substantially the same position. Accordingly, an area of an entire region in which the first cone antenna 1100-1 to the fourth cone antenna 1100-4 are disposed may be minimized.

Meanwhile, a plurality of cone antennas as shown in FIG. 14A may be disposed in plurality in a two-dimensional region. In this regard, the plurality of cone antennas may be configured with 2×1 or 4×1 cone antennas. Here, Tx multi-input multi-output (MIMO) may be implemented through 2×2, 2×4, 4×2, or 4×4 cone antennas. In addition, Rx multi-input multi-output (MIMO) may be implemented through 2×1 or 4×1 cone antennas.

Here, the electronic device may be implemented in a communication relay apparatus, a small cell base station, a base station, or the like in addition to a user terminal (UE). Here, the communication relay apparatus may be customer premises equipment (CPE) capable of providing a 5G communication service indoors. Furthermore, the vehicle may be configured to communicate with a 4G base station or a 5G base station, or may be configured to communicate with an adjacent vehicle directly or via a peripheral device.

On the other hand, a vehicle having a cone antenna with a multi-cone structure according to the present disclosure will be described with reference to FIGS. 4A to 14B. In this regard, the foregoing description of a cone antenna having a multi-cone structure may also be applied to a vehicle having a cone antenna having a multi-cone structure. In this regard, a vehicle is provided with the antenna system 1000 configured with a cone antenna. Here, the antenna system 1000 may include an antenna in which a plurality of cone antennas are arranged instead of the cone antenna. Furthermore, the antenna system 1000 may include an antenna in which a plurality of cone antennas are arranged, a transceiver circuit connected thereto, and a baseband processor.

A vehicle having a cone antenna with a multi-cone structure may include the antenna system 1000 including the metal patch 1101 and the first and second cone radiators 1100R1, 1100R2. Meanwhile, the antenna system 1000 provided in the vehicle may further include the first and second power feeders 1105-1, 1105-2.

In this regard, the first cone radiator 1100R1 is disposed to connect the first substrate S1 and the second substrate S2 spaced apart from the first substrate S1 by a predetermined gap. In this regard, the first cone radiator 1100R1 may include a first upper aperture fastened to the first substrate S1 and a first lower aperture fastened to the second substrate S2.

Furthermore, the second cone radiator 1100R2 is also disposed to connect the first substrate S1 and the second substrate S2 spaced apart from the first substrate S1 by a predetermined gap. In this regard, the second cone radiator 1100R2 may include a second upper aperture fastened to the first substrate S1 and a second lower aperture fastened to the second substrate S2.

Meanwhile, the metal patch 1101 is disposed on a front or rear surface of the first substrate S1, and disposed to be spaced apart from the first upper aperture. In addition, the first power feeder 1105-1 is disposed on the second substrate S2, and configured to transmit a first signal to the first cone radiator 1100R1 through the first lower aperture. Meanwhile, the second power feeder 1105-2 is disposed on the second substrate S2, and configured to transmit a second signal to the second cone radiator 1100R2 through the second lower aperture.

On the other hand, the antenna system 1000 disposed in the vehicle includes a plurality of cone antennas, for example, the first cone antenna 1100-1 and the fourth cone antenna 1100-4. In this regard, the plurality of cone antennas 1100-1 and 1100-2 may include the metal patch 1101, the cone radiators 1100R1, 1100R2, and the power feeder 1105.

Alternatively, the antenna system 1000 disposed in the vehicle includes a plurality of cone antennas, for example, the first cone antenna 1100-1 to the fourth cone antenna 1100-4. In this regard, the plurality of cone antennas 1100-1 to 1100-4 may include the metal patch 1101, the cone radiators 1100R1, 1100R2, and the power feeder 1105.

Furthermore, the antenna system 1000 disposed in the vehicle may further include the transceiver circuit 1250. In addition, the antenna system 1000 disposed in the vehicle may further include a processor 1400. Here, the processor 1400 may be a baseband processor configured to control the transceiver circuit 1250.

In this regard, the transceiver circuit 1250 is connected to the first and second cone radiators 1100R1, 1100R2 through the first and second power feeders 1105-1 and 1105-2, respectively. Furthermore, the transceiver circuit 1250 may control a first signal in a first frequency band to be radiated through the first cone antenna (i.e., first cone radiator 1100R1). In addition, the transceiver circuit 1250 may control a second signal in a second frequency band lower than the first frequency band to be radiated through the second cone antenna (i.e., second cone radiator 1100R2).

In this regard, when a resource of the first frequency band is allocated to the vehicle, the processor 1400 controls the transceiver circuit to perform multi-input multi-output (MIMO) through the plurality of cone radiators 1100R1. To this end, when the resource of the first frequency band is allocated to the vehicle, the processor 1400 may control the transceiver circuit 1250 to operate in the first frequency band. In this regard, the processor 1400 may inactivate a partial configuration of the transceiver circuit 1250 operating in the second frequency band.

On the contrary, when the resource of the first frequency band is allocated to the vehicle, the processor 1400 controls the transceiver circuit to perform multi-input multi-output (MIMO) through the plurality of second cone antennas 1100R2. To this end, when the resource of the second frequency band is allocated to the vehicle, the processor 1400 may control the transceiver circuit 1250 to operate in the second frequency band. In this regard, the processor 1400 may inactivate some components of the transceiver circuit 1250 operating in the second frequency band.

Meanwhile, when both the resource of the first frequency band and the resource of the second frequency band are allocated to the vehicle, the processor 1400 may use both the first cone radiator 1100R1 and the second cone radiator 1100R2. To this end, the processor 1400 may control the transceiver circuit 1250 to perform carrier aggregation (CA) on the first signal and the second signal received through the first cone radiator 1100R1 and the second cone radiator 1100R2. Accordingly, the processor 1400 may simultaneously acquire both the first and second information included in the first and second signals, respectively.

Meanwhile, a dielectric region in which the first and second cone radiators 1100R1, 1100R2 or the first to third cone radiators 1100R1 to 1100R3 are implemented in one metal patch 1101 may be configured as follows. In this regard, the metal patch 1101 includes first and second dielectric regions 1121, 1122. The first dielectric region 1121 is configured to remove metal from a region in which the first upper aperture of the first cone radiator 1100R1 is disposed. Meanwhile, the second dielectric region 1122 is configured remove metal from a region in which the second upper aperture of the second cone radiator 1100R2 is disposed. In this case, since a diameter of the second upper aperture is configured to be smaller than that of the first upper aperture, the second cone radiator 1100R2 operates in a higher frequency band than that of the first cone radiator 1100R1.

Meanwhile, each of the antennas 1100-1 to 1100-4 of the antenna system 1000 disposed in the vehicle may further include the shorting pin 1102 disposed to electrically connect the metal patch 1101 and the ground layer GND of the second substrate S2. Here, the shorting pin 1102 may be configured with a plurality of shorting pins spaced apart at a predetermined angle to vertically connect the metal patch and the ground layer GND of the second substrate S2.

On the other hand, an arrangement structure of a plurality of cone antennas and a signal transceiving method through the arrangement structure are as follows. In this regard, the cone antennas 1100-1 to 1100-4 may be disposed on an upper left, an upper right, a lower left, and a lower right of the electronic device. The arrangement form of the cone antennas 1100-1 to 1100-4 is preferably configured to maximize a separation distance between the cone antennas in the electronic device. Accordingly, mutual interference between the cone antennas 1100-1 to 1100-4 is minimized, which is advantageous in a multi-input multi-output (MIMO) or diversity operation.

In the above, an electronic device having a cone antenna according to the present disclosure has been described. The technical effects of an electronic device having such a cone antenna will be described as follows.

According to the present disclosure, there is an advantage capable of providing a multi-cone antenna module operating in a wide frequency band.

Furthermore, according to the present disclosure, one or more cone radiators operating from a low frequency band to a 5 GHz band may be optimally disposed with the metal patch in an electronic device or vehicle, thereby having an advantage capable of optimizing antenna performance.

Furthermore, according to the present disclosure, the number of shorting pins may be configured in various ways, thereby having an advantage capable of providing an optimal cone antenna module in consideration of the mobility of the vehicle.

Furthermore, according to the present disclosure, the number of shorting pins may be configured in various ways, thereby having an advantage capable of providing an optimal cone antenna module in consideration of a limited region of an electronic device.

Furthermore, according to the present disclosure, metal patches with various shapes may be disposed around an upper aperture of the cone antenna, thereby having an advantage capable of providing a broadband antenna with an optimal structure according to the operating frequency and design conditions of the antenna.

Furthermore, according to the present disclosure, a region where the metal patch is disposed in an upper region of the cone antenna and the number of shorting pins may be optimized, thereby having an advantage capable of optimizing the characteristics of the antenna as well as minimizing the overall size of the antenna.

Furthermore, according to the present disclosure, one or more cone radiators operating from a low frequency band to a 5 GHz band may be optimally disposed inside one metal patch in an electronic device or vehicle, thereby having an advantage capable of reducing a size of the antenna as well as optimizing antenna performance.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, design and operations of a plurality of cone antennas and a configuration for controlling those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

What is claimed is:

1. An electronic device having an antenna, the electronic device comprising:
a first substrate;
a second substrate spaced apart from the first substrate by a predetermined gap and provided with a ground layer;
a first cone radiator provided between the first substrate and the second substrate, an upper part of which is connected to the first substrate, a lower part of which is connected to the second substrate, and provided with an upper aperture at the upper part;
a metal patch disposed on the first substrate, and spaced apart from the upper aperture of the first cone radiator;
a second cone radiator provided between the first substrate and the second substrate, an upper part of which is connected to the first substrate, a lower part of which is connected to the second substrate, and provided with an upper aperture at the upper part; and
a shorting pin disposed to electrically connect the metal patch and the ground layer of the second substrate,
wherein the metal patch comprises:
a first dielectric region from which metal is removed in a region where the upper aperture of the first cone radiator is disposed; and
a second dielectric region from which metal is removed in a region where the upper aperture of the second cone radiator is disposed, and
wherein a diameter of the upper aperture of the second cone radiator is smaller than a diameter of the upper aperture of the first cone radiator.

2. The electronic device of claim 1, wherein the metal patch is a circular patch,
the first dielectric region of the circular patch is disposed to surround the upper aperture of the first cone radiator, and
the second dielectric region of the circular patch is disposed at one side of the upper aperture of the second cone radiator.

3. The electronic device of claim 1, further comprising:
a third cone radiator, an upper part of which is connected to the first substrate, and a lower part of which is connected to the second substrate, and provided with an upper aperture at the upper part,
wherein the metal patch further comprises a third dielectric region from which metal is removed in a region where the upper aperture of the third cone radiator is disposed, and
the upper aperture of the first cone radiator, the upper aperture of the second cone radiator and the upper aperture of the third cone radiator are disposed adjacent to the metal patch to share the metal patch.

4. The electronic device of claim 2, wherein the upper aperture of the first cone radiator, the upper aperture of the second cone radiator and the upper aperture of the third cone radiator are disposed inside a diameter of the metal patch so as to allow the first dielectric region, the second dielectric region and the third dielectric region of the metal patch to be disposed to surround the upper aperture of the first cone radiator, the upper aperture of the second cone radiator and the upper aperture of the third cone radiator, respectively.

5. The electronic device of claim 2, wherein the upper aperture of the first cone radiator is disposed within a diameter of the metal patch so as to allow the first dielectric region of the metal patch to be disposed to surround the upper aperture of the first cone radiator, and
a partial region of the upper aperture of the second cone radiator and the upper aperture of the third cone radiator is disposed outside a diameter of the metal patch so as to allow the second dielectric region and the third dielectric region to be disposed at one side of the upper aperture of the second cone radiator and the upper aperture of the third cone radiator.

6. The electronic device of claim 1, wherein the shorting pin is configured with a plurality of shorting pins spaced apart at a predetermined angle to vertically connect the metal patch and the ground layer of the second substrate.

7. The electronic device of claim 6, further comprising:
at least one non-metal supporter configured to vertically connect the first substrate and the second substrate so as to support the first substrate and the second substrate.

8. The electronic device of claim 1, wherein a first shorting pin among the plurality of shorting pins is connected to one side of the first cone radiator on the metal patch, and a second shorting pin among the plurality of shorting pins is connected to the other side of the first cone radiator on the metal patch.

9. The electronic device of claim 8, wherein the first shorting pin and the second shorting pin among the plurality of shorting pins are connected to the one side and the other side of the first cone radiator on the metal patch, and
the first shorting pin and a third shorting pin among the plurality of shorting pins are connected to one side of the second cone radiator on the metal patch.

10. The electronic device of claim 1, further comprising:
a first power feeder disposed on the second substrate to transmit a signal to the first cone radiator through a lower aperture; and
a second power feeder disposed on the second substrate to transmit a signal to the second cone radiator through a lower aperture,
wherein end portions of the first power feeder and the second power feeder are defined in ring shapes so as to correspond to the shapes of the lower apertures of the first cone radiator and the second cone radiator, respectively.

11. The electronic device of claim 10, further comprising:
a transceiver circuit connected to the first and second cone radiators through the first and second power feeders, respectively, to control a first signal in a first frequency band to be radiated through the first cone radiator, and to control a second signal to be radiated in a second frequency band higher than the first frequency band through the second cone radiator.

12. The electronic device of claim 10, further comprising:
a fastener configured to be connected to the second substrate through an inside of an end portion of the first power feeder and an end portion of the second power feeder,
wherein the first and second cone radiators are fixed to the second substrate on which the first power feeder and the second power feeder are disposed through the fastener.

13. The electronic device of claim 1, wherein the first cone radiator further comprises:
an outer rim configured to constitute the upper aperture of the first cone antenna so as to connect the first cone radiator to the first substrate; and
a fastener configured to connect the outer rim and the first substrate, and
wherein the first cone radiator is mechanically fastened to the first substrate through three fasteners on a region facing the outer rim.

14. A vehicle having an antenna, the vehicle comprising:
a first cone radiator disposed to connect a first substrate and a second substrate spaced apart from the first substrate by a predetermined gap, and provided with a first upper aperture and a first lower aperture;
a metal patch disposed on the first substrate, and spaced apart from the first upper aperture;
a second cone radiator disposed to connect the first substrate and the second substrate, and provided with a second upper aperture and a second lower aperture;

a first power feeder disposed on the second substrate to transmit a first signal through the first lower aperture of the first cone radiator; and a second power feeder disposed on the second substrate to transmit a second signal through the second lower aperture of the first cone radiator, wherein the metal patch comprises:

a first dielectric region from which metal is removed in a region where the first upper aperture of the first cone radiator is disposed; and a second dielectric region from which metal is removed in a region where the second upper aperture of the second cone radiator is disposed, and wherein a diameter of the second upper aperture of the second cone radiator is smaller than a diameter of the first upper aperture of the first cone radiator.

15. The vehicle of claim 14, wherein a cone antenna including the first and second cone radiators is implemented with a plurality of cone antennas disposed in the vehicle, and the vehicle further comprises a transceiver circuit connected to the first and second cone radiators through the first and second power feeders, respectively, to control a first signal in a first frequency band to be radiated through the first cone antenna, and to control a second signal in a second frequency band higher than the first frequency band to be radiated through the second cone antenna.

16. The vehicle of claim 15, further comprising:

a processor that controls an operation of the transceiver circuit, wherein the processor controls the transceiver circuit to perform multi-input multi-output (MIMO) through a plurality of first cone radiators when a resource of the first frequency band is allocated, and controls the transceiver circuit to perform multi-input multi-output (MIMO) through a plurality of second cone radiators when a resource of the second frequency band is allocated.

17. The vehicle of claim 16, wherein when both the resource of the first frequency band and the resource of the second frequency band are allocated, the processor controls the transceiver circuit to perform carrier aggregation (CA) on a first signal and a second signal received through the first cone radiator and the second cone radiator to acquire first and second information included in the first and second signals, respectively.

18. The vehicle of claim 14, further comprising:

a shorting pin disposed to electrically connect the metal patch and a ground layer of the second substrate, wherein the shorting pin is configured with a plurality of shorting pins spaced apart at a predetermined angle to vertically connect the metal patch and the ground layer of the second substrate.

* * * * *